United States Patent
Kumar Agrawal et al.

(10) Patent No.: US 12,002,435 B1
(45) Date of Patent: Jun. 4, 2024

(54) ELECTRONIC DEVICES AND CORRESPONDING METHODS FOR IDENTIFYING A COMPANION DEVICE TYPE

(71) Applicant: Motorola Mobility LLC, Chicago, IL (US)

(72) Inventors: Amit Kumar Agrawal, Bangalore (IN); Igor Kovalenko, Palatine, IL (US); Olivier D Meirhaeghe, Lincolnshire, IL (US); Jeffrey T Snow, Barrington, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 18/133,997

(22) Filed: Apr. 12, 2023

(51) Int. Cl.
*G09G 5/00* (2006.01)

(52) U.S. Cl.
CPC ....... *G09G 5/005* (2013.01); *G09G 2370/042* (2013.01)

(58) Field of Classification Search
CPC ....... G09G 2320/08; G09G 2340/0407; G09G 5/003; G09G 5/005; G09G 2370/042; G06F 3/14; G06F 3/1423
See application file for complete search history.

(56) References Cited

U.S. PATENT DOCUMENTS

| | | | | |
|---|---|---|---|---|
| 2013/0328878 A1* | 12/2013 | Stahl | ...................... | G09G 5/005 345/1.3 |
| 2016/0148557 A1* | 5/2016 | Hori | ...................... | G09G 3/2096 345/212 |

OTHER PUBLICATIONS

Katzmaier, David, "LG Display's crazy 65-inch OLED TV can roll up like a poster", Published Jan. 9, 2018; Available online at https://www.cnet.com/tech/home-entertainment/lg-display-crazy-65-inch-oled-tv-can-roll-up-like-a-poster-ces-2018/.
Matthes, Jonah, "What is HDMI EDID? Everything You Need to Know!", Published Feb. 24, 2022; available online at https://thehometheaterdiy.com/hdmi-edid/.
"Adjusting the IPD on the Headset—Vive Support", Unknown exact publication date but prior to filing of present application; Viewed online Apr. 6, 2023 at https://www.vive.com/us/support/vive-pro-eye/category_howto/adju . . . nce%20(IPD)%20is%20the,have%20a%20better%20viewing%20experience.
Kendall, et al., "Essentials of DisplayPort Display Stream Compression (DSC) Protocols)", Webinar slide deck Feb. 2018; By Teledyne Lecroy (74 pages).

* cited by examiner

*Primary Examiner* — Koosha Sharifi-Tafreshi
(74) *Attorney, Agent, or Firm* — Philip H. Burrus, IV

(57) ABSTRACT

An electronic device includes a communication device and a user interface. The communication device detects establishment of an electrical communication channel to a content presentation companion device. One or more processors operable with the communication device and the user interface cause the communication device to query the content presentation companion device for a content presentation companion device port facilitating the electrical communication channel and, in response, cause the user interface to identify the content presentation companion device port.

20 Claims, 11 Drawing Sheets

| ADDRESS | DATA | GENERAL DESCRIPTION |
|---|---|---|
| 0-7 | Header | Constant Fixed Pattern |
| 8-9<br>10-11<br>12-14<br>16-17 | Manufacturer ID<br>Product ID Code<br>Serial Number<br>Manufacture Date | Display Product Identification |
| 18<br>19 | EDID Version No.<br>EDID Revision No. | EDID Version Information |
| 20<br>21<br>22<br>23<br>24 | Video Input Type<br>Horizontal Size (cm)<br>Vertical Size (cm)<br>Display Gamma<br>Supported Features | Basic display parameters. Video input type, display size, power management, sync, color space, timing capabilities and preferences. |
| 25-34 | Color Characteristicis | Color space Definition |
| 35-36<br>37<br>38-53<br>54-71<br>72-89<br>90-107<br>108-125 | Established Supported Timings<br>Manufacturer's Reserved Timing<br>EDOD Standard Timings Supported<br>Detailed Timing Descriptior Block 1<br>Detailed Timing Descriptor Block 2<br>Detailed Timing Descriptor Block 3<br>Detailed Timing Descriptor Block 4 | Timing information for all resolutions supported by the display. |
| 126 | Extension Flag | Number of optional extension blocks |
| 127 | Checksum | |

FIG. 10
-- PRIOR ART --

| ADDRESS | GENERAL DESCRIPTION |
|---|---|
| 0 | Always "N," where N is the new extension |
| 1 | Revision number |
| 2 | Pointer to timing descriptors |
| 3 | Number of timing descriptors |
| 4 to d-1 | Data block description indicating field of view and/or pixel density per degree for companion device (zero unless companion device is glasses) |
| d to d+17 | First 18-byte detailed timing descriptor |
|  | ⋮ |
| d+18(n-1) to d+18n-1 | Final 18-byte detailed timing descriptor |
| d+18n to 126 | "0" Padding |
| 127 | Checksum |

*FIG. 11*

ELECTRONIC DEVICES AND CORRESPONDING METHODS FOR IDENTIFYING A COMPANION DEVICE TYPE

BACKGROUND

Technical Field

This disclosure relates generally to electronic devices having communication circuits, and more particularly to electronic devices engaged in the transmission of signals supplied in digital form, including data transmission and telegraphic communication, with a content presentation companion device.

Background Art

The advanced processing power available in modern electronic communication devices, examples of which include smartphones, tablet computers, and laptop computers, enable voice and video communications between people. Additionally, such devices can also engage in videoconferences, stream content such as movies, videos, and television shows, play music, and offer other forms of entertainment. In addition to being tools for communicating with friends, family, and work colleagues, these devices are also real-time multimedia content entertainment devices.

Some electronic devices are equipped to operate in conjunction with companion devices. Illustrating by example, content can be redirected to a content presentation companion device for enhanced visibility and/or provide a user interface to interactively work with content being presented by the electronic device or the companion device. Companion device operability can redirect content from a first device, such as a smartphone, to a second device, such as a monitor, to make events such as movies, television shows, and videoconferences easier to see. It can also allow the companion device to serve as the primary user interface and/or display for the electronic device itself. While a neat feature, configuring operation between an electronic device and different types of companion devices can be cumbersome. It would be advantageous to have electronic devices and systems that make this process simpler.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

FIG. 10 illustrates a prior art extended display identification data (EDID) file structure.

FIG. 11 illustrates one explanatory EDID extension block of data in accordance with one or more embodiments of the disclosure.

Figure 1:
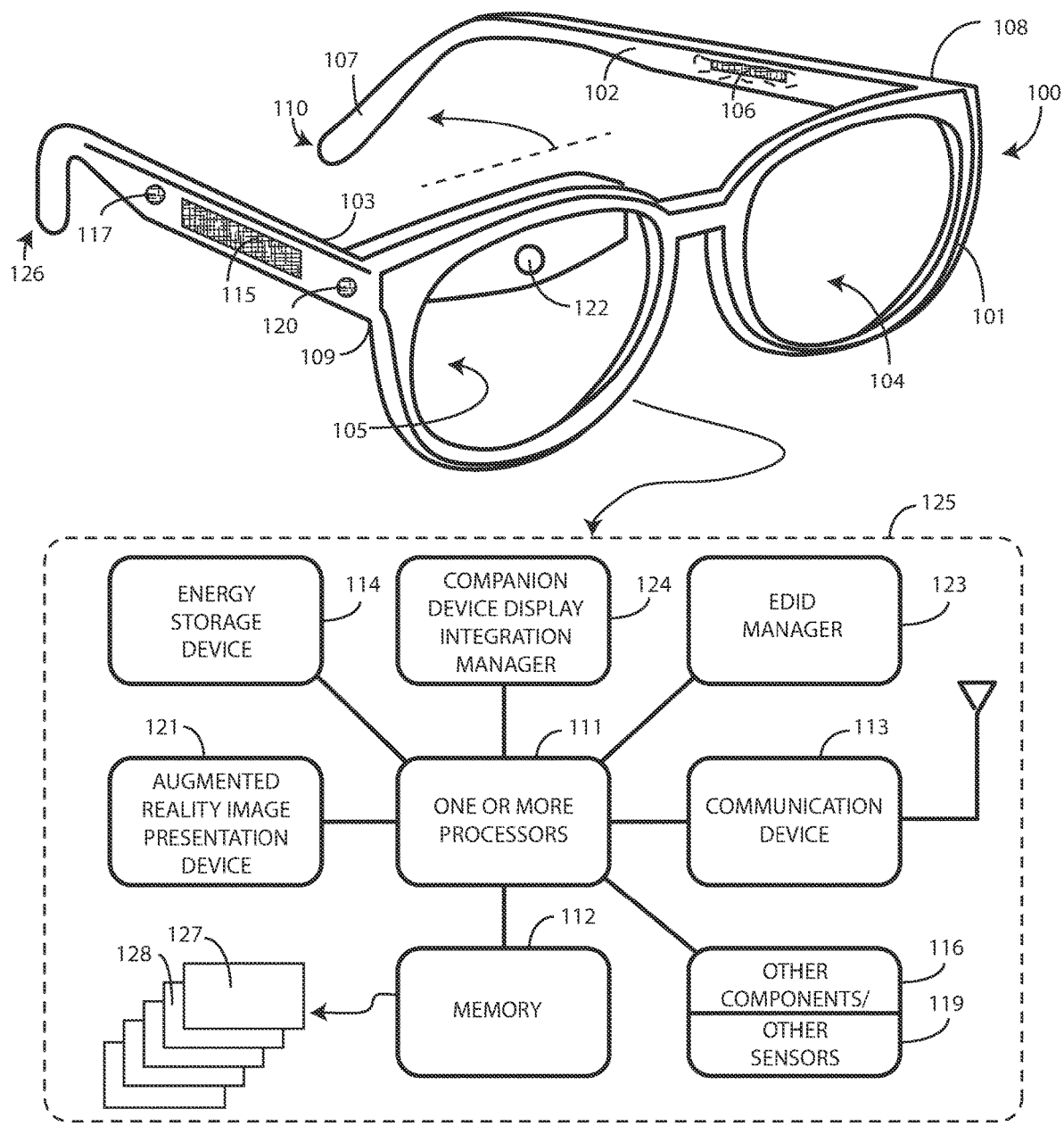
FIG. 1 illustrates one explanatory companion device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to causing, in response to a communication device detecting establishment of an electrical communication channel with a companion device, the communication device to query the companion device to determine what type of companion device the companion device is. Illustrating by example, the companion device can be a monitor, projector, wearable glass projection device, or other type of companion device. The querying allows the electronic device to quickly and efficiently (as well as automatically) determine the type of content presentation companion device with which it is communicating.

Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of querying, with a communication device, a companion device in communication across a wired electrical communication channel with the electronic device to determine a companion device type, receiving an EDID extension comprising one of a field of view or pixel density, and determining, with one or more processors operable with the communication device, that the companion device consists of a wearable glass projection device when the field of view or pixel density has a non-zero value as described herein. The non-processor circuits may include, but are not limited to, a radio receiver, a radio transmitter, signal drivers, clock circuits, power source circuits, and user input devices.

As such, these functions may be interpreted as steps of a method to perform identifying a companion device electronically in communication with a wireless communication device as being a wearable glass projection device when a received EDID extension from the companion device includes a non-zero value field of view or pixel density value. Alternatively, some or all functions could be implemented by a state machine that has no stored program instructions, or in one or more application specific integrated circuits (ASICs), in which each function or some combinations of certain of the functions are implemented as custom logic.

Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide an electronic device that is operable with one or more embodiments companion devices. Examples of such companion devices include monitors, projectors, and wearable glass projection devices. Examples of wearable glass projection devices include augmented reality companion devices and virtual reality companion devices.

In one or more embodiments, once the communication device of the electronic device establishes an electrical communication channel with a companion device, the communication device queries the companion device to determine whether the companion device is a projector, a monitor, or a wearable glass projection device. In one or more embodiments, the querying process comprises the exchange of EDID. In particular, in one or more embodiments one or more processors of the electronic device determine, in response to receiving EDID and an extension of the EDID in response to the query, whether the companion device is the projector, the monitor, or the wearable glass projection device by extracting a display size from the EDID and a field of view from the extension of the EDID.

Embodiments of the disclosure contemplate that the specifications differ between companion devices with which the electronic device may be operable. A monitor may have a non-zero display size but is generally not thought of as having a "field of view." Instead, monitor sizes are specified as having a length and width selected for users who are seated approximately four to eight feet from the monitor.

The same cannot be said for a wearable glass projection device such as an augmented reality companion device or virtual reality companion device. What the user sees is neither related to the physical size of the image generation component or a viewing area that is visible by the user. Instead, embodiments of the disclosure find it far more favorable to speak of specifications for a wearable glass projection device in terms of field of view or pixel density. Projectors, meanwhile, simply project with display size being a function of the distance between the projector and the projection surface.

Accordingly, embodiments of the disclosure advantageously provide a two-specification "code" that allows an electronic device to quickly, efficiently, and automatically determine the type of companion device with which it is communicating. Illustrating by example, in one or more embodiments one or more processors of the electronic device determine that the companion device is a monitor anytime the display size received in EDID has a non-zero value. By contrast, the one or more processors determine that the companion device is a projector when the display size received in the EDID and the field of view received in the extension of the EDID are both zero. When the display size is zero and the field of view is a non-zero value, the one or more processors determine that the companion device is a wearable glass projection device.

When the companion device is a monitor, the one or more processors can render content in accordance with the display size and can cause the communication device to transmit the rendered content to the monitor. When the companion device is the projector, the one or more processors can render content in accordance with a default projector parameter and transmit the rendered content to the projector.

Similarly, if the companion device is a wearable glass projection device, the one or more processors can determine whether the wearable glass projection device is an augmented reality companion device or a virtual reality companion device. The one or more processors can render augmented reality content in accordance with the field of view and can cause the communication device to transmit the rendered augmented reality content to the augmented reality companion device, one example of which are augmented reality glasses.

The type of companion device can be determined in other ways as well. Illustrating by example, in one or more embodiments the one or more processors determine whether the companion device is the monitor, the projector, or the wearable glass projection device by parsing a product identification code from EDID received by the communication device from the companion device in response to the query. The one or more processors can parse the product identification code by transmitting a field of view query comprising the product identification code to a remote electronic device. The remote electronic device can then send a field of view in response.

Additionally, embodiments of the disclosure contemplate that pixel density can be used as an alternate specification for wearable glass projection device. Indeed, in one or more embodiments the extension of the EDID contains a non-zero pixel density when the companion device is a wearable glass projection device rather than a field of view. Accordingly, in one or more embodiments the one or more processors of the electronic device can determine the identity of the companion device, in response to the communication device receiving an extension of the EDID in response to the query, that the companion device is the wearable glass projection device by extracting a pixel density having a non-zero value from the extension of the EDID. In one or more embodiments, the pixel density is expressed in pixels per degree.

Embodiments of the disclosure can be used to identify the type of companion device when that companion device is operating as a content presentation companion device. Some modern portable electronic devices are equipped with a content redirection feature. Using smartphones manufactured by Motorola Mobility. sup. TM as one illustrative example, some models are equipped with their Ready For..sup.TM, which is a feature that allows the Ready For..sup.TM device to connect to a content presentation companion device such as a larger monitor, television, or other device having a larger screen. Using the Ready For.sup.TM feature, users can wirelessly stream video content to the larger display of a content presentation companion device with no loss in performance. Illustrating by example, resolution of the images on the content presentation companion device is up to 4K with a frame rate that presents content without flicker or distortion.

When using the Ready For.sup.TM feature, companion device identification allows the one or more processors of the smartphone (or other electronic device) to properly render the content for the specific type of content presentation companion device to which the content is being delivered. This advantageously prevents desktop experience renderings of computer workspaces from being too large or from being presented in an improper resolution.

In one or more embodiments, an electronic device determines that the electronic device is connected to a companion device. This determination can be done by querying EDID of the companion device in one or more embodiments. In one or more embodiments, the EDID comprises a monitor size while an extension of the EDID comprises a field indicating a field of view or pixel density. If the EDID does not include these specifications, the electronic device can extract a connected device model and can parse the model database (using the web or a locally stored database) to determine if the companion device is a monitor, projector, or wearable glass projection device.

Embodiments of the disclosure contemplate that geometrically speaking, a wearable glass projection device such as an augmented reality companion device or a virtual reality companion device will include an image generation device that is just a few inches from the eyes of a user in many cases. However, that same device will have a field of view allowing a display size similar to a large monitor situated several feet away. Advantageously, by rendering content for the wearable glass projection device in accordance with a field of view or pixel density extracted from an extension of EDID, an electronic device can tune the rendering to achieve the optimal user interface to be rendered by the wearable glass projection device. This occurs because, for wearable glass projection devices, first operating condition is a function of distance, and the physical size of the actual projection is calculated using the size of the image generation device and an optimal distance at which the content should be viewed. Accordingly, using a field of view or pixel density parameter, virtual reality or augmented reality content looks perfect every time.

Embodiments of the disclosure contemplate that for a wearable glass projection device, field of view is a principal design key performance indicator (KPI). Accordingly, for a given wearable glass projection device design, the field of view is known and can be stored in an extension of EDID. This is advantageous because directly calculating a field of view for a particular wearable glass projection device is generally not straightforward due to various possible design elements that may be present in the wearable glass projection device, as well as the physical distance from the eye to the image rendering surface. Additionally, there may be mirrors, lenses, and so forth along the optical path that complicate the calculation.

For this reason, embodiments of the disclosure advantageously include the field of view (or an equivalent pixel density) in an extension of the EDID. Identification logic can then be employed that determines a companion device is a monitor when the display size is non-zero. If the display size is zero and the field of view is zero, the companion device is a projector. If the display size is zero and the field of view is non-zero, the companion device is a wearable glass projection device, and so forth. Embodiments of the disclosure advantageously allow for backwards compatibility of electronic devices with new wearable glass projection devices.

In one or more embodiments, an electronic device comprises a wireless communication device and one or more processors operable with the wireless communication device. In one or more embodiments the one or more processors identify a companion device electronically in communication with the wireless communication device as being a wearable glass projection device when a received EDID extension from the companion device includes a non-zero field of view or pixel density value. If, for example, the wearable glass projection device comprises augmented reality glasses, from this determination the one or more processors can render augmented reality content with a number of pixels per degree defined by the non-zero field of view to create rendered augmented reality content. The one or more processors can then cause the wireless communication device to transmit the rendered augmented reality content to the augmented reality glasses when the received EDID extension form the companion device includes the non-zero field of view or pixel density value. Other advantages offered by embodiments of the disclosure will be described below. Still others will be obvious to those of ordinary skill in the art having the benefit of this disclosure.

Turning now to FIG. 1, illustrated therein is one explanatory companion device 100 configured in accordance with one or more embodiments of the disclosure. The companion device 100 of FIG. 1 is a wearable glass projection device and, in particular, is an augmented reality companion device configured to operate in conjunction with an electronic device to provide augmented reality content to a user. While the companion device 100 of FIG. 1 is shown as being an augmented reality companion device for explanatory purposes, wearable glass projection devices configured in accordance with embodiments of the disclosure can take other forms as well. Illustrating by example, as will be discussed in more detail below with reference to FIG. 6, in other embodiments a wearable glass projection device can be configured as a virtual reality companion device. Additionally, companion devices configured in accordance with embodiments of the disclosure do not have to be wearable glass projection devices. They can also be monitors, projectors, or other types of devices.

The augmented reality companion device of FIG. 1 is shown illustratively as being augmented reality glasses. However, it should be noted that the augmented reality companion device could be configured in any number of other ways as well. Illustrating by example, augmented reality companion device could also be configured as any of sunglasses, goggles, masks, shields, or visors. Other forms of the augmented reality companion device will be obvious to those of ordinary skill in the art having the benefit of this disclosure.

The companion device 100 of FIG. 1 includes a frame 101 and one or more stems 102,103. Here, the one or more stems 102,103 comprise a first stem 102 and a second stem 103. One or more lenses 104,105 can be disposed within the frame 101. The lenses 104,105 can be prescription or non-prescription, and can be clear, tinted, or dark. In one or more embodiments the stems 102,103 are pivotable from a first position where they are situated adjacent to, and parallel with, the frame 101, to a second, radially displaced open position shown in FIG. 1. However, in other embodiments the stems 102,103 may be fixed relative to the frame 101. In still other embodiments, such as might be the case if the companion device 100 were configured as goggles, the stems 102,103 may be flexible or soft. For example, the stems of goggles are frequently elasticized fabric, which is soft, flexible, pliable, and stretchy. Other types of stems 102,103 will be obvious to those of ordinary skill in the art having the benefit of this disclosure.

In one or more embodiments the stems 102,103 attach to the frame 101 at a first end 108,109 and extend distally from the frame 101 to a second, distal end 110,126. In one embodiment, each stem 102,103 includes a temple portion 106 and an ear engagement portion 107. The temple portion 106 is the portion of the stem 102,103 passing from the frame 101 past the temple of a wearer, while the ear engagement portion 107 engages the wearer's ear to retain the augmented reality glasses to the wearer's head.

Since the companion device 100 is configured as an electronic device, one or both of the frame 101 and the stems 102,103 can comprise one or more electrical components. These electrical components are shown illustratively in a schematic block diagram 125 in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 111. The one or more processors 111 can be disposed in one (or both) of the stems 102,103 and/or the frame 101. The one or more processors 111 can be operable with a memory 112. The one or more processors 111, which may be any of one or more microprocessors, programmable logic, application specific integrated circuit device, or other similar device, are capable of executing program instructions and methods described herein. The program instructions and methods may be stored either on-board in the one or more processors 111, or in the memory 112, or in other computer readable media coupled to the one or more processors 111.

The one or more processors 111 can be configured to operate the various functions of the companion device 100, and also to execute software or firmware applications and modules that can be stored in a computer readable medium, such as memory 112. The one or more processors 111 execute this software or firmware, in part, to provide device functionality. The memory 112 may include either or both static and dynamic memory components, may be used for storing both embedded code and user data.

In one or more embodiments, the companion device 100 also includes an optional wireless communication device 113. Where included, the wireless communication device 113 is operable with the one or more processors 111 and is used to facilitate electronic communication with one or more electronic devices or servers or other communication devices across a network. Note that it is possible to combine the one or more processors 111, the memory 112, and the wireless communication device 113 into a single device, or alternatively into devices having fewer parts while retaining the functionality of the constituent parts.

The wireless communication device 113, which may be one of a receiver or transmitter and may alternatively be a transceiver, operates in conjunction with the one or more processors 111 to electronically communicate through a communication network. For example, in one embodiment, the wireless communication device 113 can be configured to communicate through a traditional cellular network. Other examples of networks with which the communication circuit may communicate include proprietary networks and direct communication networks. In other embodiments, the wireless communication device 113 can communicate with near field or local area networks, infrared communication circuits, magnetic field modulation circuits, and Wi-Fi circuits. In one or more embodiments, the wireless communication device 113 can be configured to provide messaging functionality to deliver electronic messages to remote devices.

A battery 114 or other energy storage device can be included to provide power for the various components of the companion device 100. While a battery 114 is shown in FIG. 1, it will be obvious to those of ordinary skill in the art having the benefit of this disclosure that other energy storage devices can be used instead of the battery 114, including a micro fuel cell or an electrochemical capacitor. The battery 114 can include a lithium-ion cell, lithium polymer cell, or a nickel metal hydride cell, such cells having sufficient energy capacity, wide operating temperature range, large number of charging cycles, and long useful life. The battery 114 may also include overvoltage and overcurrent protection and charging circuitry. In one embodiment, the battery 114 comprises a small, lithium polymer cell.

In one or more embodiments, a photovoltaic device 115, such as a solar cell, can be included to recharge the battery 114. In one embodiment, the photovoltaic device 115 can be disposed along the temple portion 106 of the stems 102,103. In this illustrative embodiment, two solar cells are disposed in the temple portion 106 of each stem 102,103, respectively.

Other components 116 can be optionally included in the companion device 100 as well. For example, in one embodiment one or more microphones can be included as audio capture devices 117. These audio capture devices can be operable with the one or more processors 111 to receive voice input. Additionally, in one or more embodiments the audio capture devices 117 can capture ambient audio noise. Signals corresponding to captured audio can be transmitted to an electronic device in communication with the companion device 100 or a server or cloud-computing device. The other component 116 can additionally include loudspeakers for delivering audio content to a user wearing the companion device 100.

The other components 116 can also include a motion generation device for providing haptic notifications or vibration notifications to a user. For example, a piezoelectric transducer, rotational motor, or other electromechanical device can be configured to impart a force or vibration upon the temple portion 106 of the stems 102,103, or alternatively along the frame 101. The motion generation device can provide a thump, bump, vibration, or other physical sensation to the user. The one or more processors 111 can be configured to actuate the motion generation device to deliver a tactile or vibration output alone or in combination with other outputs such as audible outputs.

Similarly, in one or more embodiments the companion device 100 can include a video capture device such as an imager. The imager can be disposed within the frame 101 or stems 102,103. In one or more embodiments, the video capture device can function as a to detect changes in optical intensity, color, light, or shadow in the near vicinity of the companion device 100. As with the audio capture device 117, captured video information can be transmitted to an electronic device, a remote server, or cloud-computing device.

Other sensors 119 can be optionally included in the companion device 100. One example of such a sensor is a global positioning system device for determining where the companion device 100 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other sensors 119 can also include an optional user interface. The user interface can be used, for example, to activate the circuit components or turn them OFF, control sensitivity of the other sensors 119, and so forth. The user interface, where included, can be operable with the one or more processors 111 to deliver information to, and receive information from, a user. The user interface can include a rocker switch, slider pad, button, touch-sensitive surface, or other controls, and optionally a voice command interface. These various components can be integrated together.

In one or more embodiments, an audio output device 120, such as a loudspeaker or other transducer, can deliver audio output to a user. For example, piezoelectric transducers can be operably disposed within the stems 102,103. Actuation of the piezoelectric transducers can cause the stems 102,103 to vibrate, thereby emitting acoustic output. More traditional audio output devices 120, such as loudspeakers, can be used as well.

The other components 116 can optionally include a haptic device providing haptic feedback to a user. The haptic device can include a motion generation device to deliver a tactile response to the user. For example, a piezoelectric transducer or other electromechanical device can be included in the stems 102,103. The transducer can actuate to impart a force upon the user's head to provide a thump, bump, vibration, or other physical sensation to the user. The inclusion of both the audio output device 120 and the haptic device allows both audible and tactile feedback to be delivered.

In one or more embodiments, the companion device 100 includes an augmented reality image presentation device 121 operable to deliver augmented reality imagery to a user. The augmented reality image presentation device 121 can be operable with a projector 122. In the illustrative embodiment of FIG. 1, the frame 101 supports the projector 122. In one or more embodiments the projector 122 is configured to deliver images to a holographic optical element when the companion device 100 is operating in an augmented reality mode of operation.

In one embodiment, the projector 122 is a modulated light projector operable to project modulated light images along a surface or holographic optical element. In another embodiment, the projector 122 is a thin micro projector. In another embodiment, the projector 122 can comprise a laser projector display module. Other types of projectors will be obvious to those of ordinary skill in the art having the benefit of this disclosure.

In one or more embodiments, the projector 122 can include a lens and a spatial light modulator configured to manipulate light to produce images. The projector 122 can include a light source, such as a single white light emitting diode, multiple separate color light emitting diodes, or multiple separate color laser diodes that deliver visible light to the spatial light modulator through a color combiner. The augmented reality image presentation device 121 can drive the spatial light modulator to modulate the light to produce images. The spatial light modulator can be optically coupled (e.g., by free space propagation) to the lens and/or a beam steerer. Where used, a beam steerer serves to steer a spatially modulated light beam emanating from the spatial light modulator through the lens to create images.

Embodiments of the disclosure contemplate that the specifications differ between companion devices with which an electronic device may be operable. A monitor may have a non-zero display size but is generally not thought of as having a "field of view." The same cannot be said for a wearable glass projection device such as the companion device 100 shown in FIG. 1 or the companion device (600) shown below in FIG. 6. What the user sees when the augmented reality image presentation device 121 is operational is neither related to the physical size of the augmented reality image presentation device 121 or a viewing area that is visible by the user. Instead, embodiments of the disclosure find it far more favorable to speak of specifications for the augmented reality image presentation device 121 in terms of field of view or pixel density.

Embodiments of the disclosure contemplate that for wearable glass projection device such as the companion device 100 of FIG. 1, field of view is a principal KPI. Accordingly, for a given augmented reality image presentation device 121 design, the field of view is known and can be stored in an extension 128 of EDID 127 that is stored in the memory 112 and delivered to another electronic device via the communication device 113, either automatically or in response to queries from the other electronic device. This is advantageous because when the other electronic device is delivering rendered content for presentation by the augmented reality image presentation device 121, this content can be rendered in accordance with a specified field of view for proper presentation.

For this reason, embodiments of the disclosure advantageously include the field of view (or an equivalent pixel density) metric in an extension 128 of the EDID 127 stored in the memory 112 of the companion device 100. Identification logic can then be employed that determines the companion device is a wearable glass projection device due to the fact that the display size is zero and the field of view is non-zero.

In one or more embodiments, the companion device 100 includes a companion device display integration manager 124. The companion device display integration manager 124 can be used to communicate with a companion electronic device.

Illustrating by example, in one or more embodiments the companion device 100 comes in different sizes. When another electronic device wishes to determine whether the size of the companion device 100 is below a predefined size threshold, the other electronic device may interrogate the companion device 100 using the communication device 113.

The companion device display integration manager 124 may provide size, user profile, or other information associated with the companion device 100 to the other electronic device using the communication device 113 in response. This is addition to the ability to deliver EDID 127 and/or an extension 128 of the EDID 127 including a non-zero value for the field of view (or alternatively pixel density).

Additionally, when another device transmits event notifications, subtitles, or other contextual information to the companion device 100, the companion device display integration manager 124 can deliver that information to the augmented reality image presentation device 121 for presentation to the user as an augmented reality experience via the projector 122.

Figure 2:
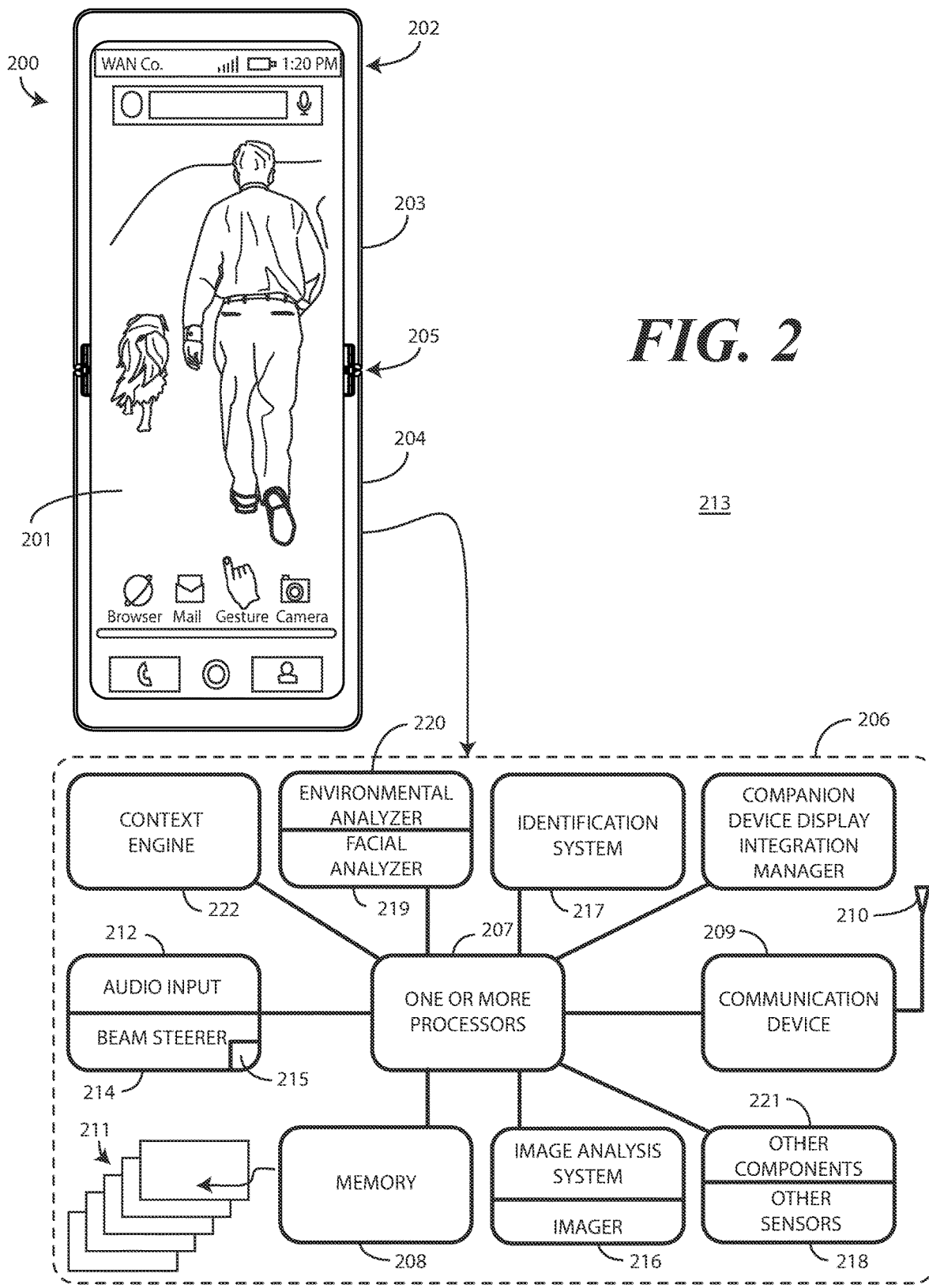
FIG. 2 illustrates one explanatory electronic device in accordance with one or more embodiments of the disclosure.

The companion device 100 of FIG. 1 can operate as a stand-alone electronic device in one or more embodiments. However, in other embodiments, the companion device 100 can operate in tandem with an electronic device, via wireless electronic communication using the wireless communication device 113 or via a wired connection channel 123 to form an augmented reality system. Turning now to FIG. 2, illustrated therein is one such electronic device 200.

The electronic device 200 of FIG. 2 is a portable electronic device and is shown as a smartphone for illustrative purposes. However, it should be obvious to those of ordinary skill in the art having the benefit of this disclosure that other electronic devices may be substituted for the explanatory smart phone of FIG. 2. For example, the electronic device 200 could equally be a conventional desktop computer, palm-top computer, a tablet computer, a gaming device, a media player, or other device.

This illustrative electronic device 200 includes a display 201, which may optionally be touch-sensitive. Users can deliver user input to the display 201, which serves as a user interface for the electronic device 200. In one embodiment, users can deliver user input to the display 201 of such an embodiment by delivering touch input from a finger, stylus, or other objects disposed proximately with the display 201. In one embodiment, the display 201 is configured as an active-matrix organic light emitting diode (AMOLED) display. However, it should be noted that other types of displays, including liquid crystal displays, would be obvious to those of ordinary skill in the art having the benefit of this disclosure.

The explanatory electronic device 200 of FIG. 2 also includes a device housing 202. In one embodiment, the device housing 202 includes two housing members, namely, a first device housing 203 that is coupled to a second device housing 204 by a hinge 205 such that the first device housing 203 is pivotable about the hinge 205 relative to the second device housing 204 between a closed position and an axially displaced open position. In other embodiments, the device housing 202 will be rigid and will include no hinge.

In still other embodiments, the device housing 202 will be manufactured from a flexible material such that it can be bent and deformed. Where the device housing 202 is manufactured from a flexible material or where the device housing 202 includes a hinge, the display 201 can be manufactured on a flexible substrate such that it bends. In one or more embodiments, the display 201 is configured as a flexible display that is coupled to the first device housing 203 and the second device housing 204, spanning the hinge 205. Features can be incorporated into the device housing 202, including control devices, connectors, and so forth.

Also shown in FIG. 2 is an explanatory block diagram schematic 206 of the explanatory electronic device 200. In one or more embodiments, the block diagram schematic 206 is configured as a printed circuit board assembly disposed within the device housing 202 of the electronic device 200. Various components can be electrically coupled together by conductors, or a bus disposed along one or more printed circuit boards.

The illustrative block diagram schematic 206 of FIG. 2 includes many different components. Embodiments of the disclosure contemplate that the number and arrangement of such components can change depending on the particular application. Accordingly, electronic devices configured in accordance with embodiments of the disclosure can include some components that are not shown in FIG. 2, and other components that are shown may not be needed and can therefore be omitted.

In one embodiment, the electronic device includes one or more processors 207. In one embodiment, the one or more processors 207 can include an application processor and, optionally, one or more auxiliary processors. One or both of the application processor or the auxiliary processor(s) can include one or more processors. One or both of the application processor or the auxiliary processor(s) can be a microprocessor, a group of processing components, one or more ASICs, programmable logic, or other type of processing device.

The application processor and the auxiliary processor(s) can be operable with the various components of the block diagram schematic 206. Each of the application processor and the auxiliary processor(s) can be configured to process and execute executable software code to perform the various functions of the electronic device with which the block diagram schematic 206 operates. A storage device, such as memory 208, can optionally store the executable software code used by the one or more processors 207 during operation.

In this illustrative embodiment, the block diagram schematic 206 also includes a communication device 209 that can be configured for wired or wireless communication with one or more other devices or networks. The networks can include a wide area network, a local area network, and/or personal area network. The communication device 209 may also utilize wireless technology for communication, such as, but are not limited to, peer-to-peer or ad hoc communications such as HomeRF, Bluetooth and IEEE 802.11, and other forms of wireless communication such as infrared technology. The communication device 209 can include wireless communication circuitry, one of a receiver, a transmitter, or transceiver, and one or more antennas 210.

In one embodiment, the one or more processors 207 can be responsible for performing the primary functions of the electronic device with which the block diagram schematic 206 is operational. For example, in one embodiment the one or more processors 207 comprise one or more circuits operable with the display 201 to present presentation information to a user. The executable software code used by the one or more processors 207 can be configured as one or more modules 211 that are operable with the one or more processors 207. Such modules 211 can store instructions, control algorithms, and so forth.

In one or more embodiments, the block diagram schematic 206 includes an audio input/processor 212. The audio input/processor 212 is operable to receive audio input from an environment 213 about the electronic device 200. The audio input/processor 212 can include hardware, executable code, and speech monitor executable code in one embodiment. The audio input/processor 212 can be operable with one or more predefined identification references stored in memory 208. With reference to audio input, the predefined identification references can comprise representations of basic speech models, representations of trained speech models, or other representations of predefined audio sequences that are used by the audio input/processor 212 to receive and identify voice commands that are received with audio input captured by an audio capture device. In one embodiment, the audio input/processor 212 can include a voice recognition engine. Regardless of the specific implementation utilized in the various embodiments, the audio input/processor 212 can access various speech models stored with the predefined identification references to identify speech commands, languages being spoken, and other information.

The audio input/processor 212 can include a beam steering engine 214 comprising one or more microphones 215. Input from the one or more microphones 215 can be processed in the beam steering engine 214 such that the one or more microphones define a virtual microphone. This virtual microphone can define an acoustic reception cone that can be virtually "steered" around the electronic device 200. Alternatively, actual steering can occur as well, such as switching between a left and right microphone or a front and back microphone or switching various microphones ON and OFF individually. In one or more embodiments, two or more microphones 215 can be included for selective beam steering by the beam steering engine 214.

Illustrating by example, a first microphone can be located on a first side of the electronic device 200 for receiving audio input from a first direction, while a second microphone can be placed on a second side of the electronic device 200 for receiving audio input from a second direction. These microphones can be "steered" by selectively turning them ON and OFF. The beam steering engine 214 can then select between the first microphone and the second microphone to beam steer audio reception toward an object, such as a user delivering audio input. This beam steering can be responsive to input from other sensors, such as imagers, facial depth scanners 219, thermal sensors, or other sensors.

For example, an imager 216 can estimate a location of a person's face and deliver signals to the beam steering engine 214 alerting it in which direction to focus the acoustic reception cone and/or steer the first microphone and the second microphone, thereby adding confirmation to audio steering and saving time. Where multiple people are around the electronic device 200, this steering advantageously directs a beam reception cone toward a particular person so that languages spoken, language preferences, and other information about the person's speech can be ascertained.

Alternatively, the beam steering engine 214 processes and combines the signals from two or more microphones to perform beam steering. The one or more microphones 215 can be used for voice commands and/or for language recognition. In response to control of the one or more microphones 215 by the beam steering engine 214, a user location direction can be determined. The beam steering engine 214 can then select between the first microphone and the second microphone to beam steer audio reception toward the user. Alternatively, the audio input/processor 212 can employ a weighted combination of the microphones to beam steer audio reception toward the user.

The one or more processors 207 can perform filtering operations on audio input received by the audio input/processor 212. For example, in one embodiment the one or more processors 207 can filter the audio input into identifiable audio input, i.e., first audio input, and other audio input that is not identifiable, i.e., second audio input.

Various sensors 218 can be operable with the one or more processors 207. One example of a sensor that can be included with the various sensors 218 is a touch sensor. The touch sensor can include a capacitive touch sensor, an infrared touch sensor, resistive touch sensors, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., the one or more processors 207, to detect an object in close proximity with—or touching—the surface of the display 201 or the device housing 202 of the electronic device 200 by establishing electric field lines between pairs of capacitive sensors and then detecting perturbations of those field lines.

Another example of a sensor that can be included with the various sensors 218 is a geo-locator that serves as a location detector. In one embodiment, location detector is able to determine location data when authenticating a user. Location can be determined by capturing the location data from a constellation of one or more earth orbiting satellites, or from a network of terrestrial base stations to determine an approximate location. The location detector may also be able to determine location by locating or triangulating terrestrial base stations of a traditional cellular network, or from other local area networks, such as Wi-Fi networks.

Another example of a sensor that can be included with the various sensors 218 is an orientation detector operable to determine an orientation and/or movement of the electronic device 200 in three-dimensional space. Illustrating by example, the orientation detector can include an accelerometer, gyroscopes, or other device to detect device orientation and/or motion of the electronic device 200. Using an accelerometer as an example, an accelerometer can be included to detect motion of the electronic device. Additionally, the accelerometer can be used to sense some of the gestures of the user, such as one talking with their hands, running, or walking.

The orientation detector can determine the spatial orientation of an electronic device 200 in three-dimensional space by, for example, detecting a gravitational direction. In addition to, or instead of, an accelerometer, an electronic compass can be included to detect the spatial orientation of the electronic device relative to the earth's magnetic field. Similarly, one or more gyroscopes can be included to detect rotational orientation of the electronic device 200.

An identification system 217 is operable with the one or more processors 207. In one or more embodiments, the identification system 217 is operable with both the one or more processors 207 and the communication device 209. The identification system 217, operating with the one or more processors 207, can cause the communication device 209, in response to the communication device 209 detecting establishment of an electrical communication channel with a companion device (100) such as that described above with reference to FIG. 1, to query the companion device (100) to determine what type of device the companion device (100) is. Illustrating by example, the identification system 217 can cause the communication device 209 to query the companion device (100) to determine whether the companion device (100) is a projector, a monitor, or a wearable glass projection device.

In one or more embodiments, this querying results in the companion device (100) retrieving EDID (127) and/or an extension (128) of EDID (127) from a memory (112) and transmitting it to the electronic device 200 in response to the query. In one or more embodiments, the identification system 217 and one or more processors 207 then determine, in response to the communication device 209 receiving the EDID (127) and extension (128) of the EDID (127) whether the companion device (100) is a projector, a monitor, or the wearable glass projection device of FIG. 1 by extracting a display size from the EDID (127) and a field of view from the extension (128) of the EDID (127).

In one or more embodiments, the identification system 217 and one or more processors 207 determine that the companion device is a monitor when the display size is a non-zero value. When this occurs, the one or more processors 207 can render content in accordance with the display size and can cause the communication device 209 to transmit the rendered content to the monitor.

In one or more embodiments, the identification system 217 and one or more processors 207 determine that the companion device is a projector when the display size and the field of view are both zero. When this occurs, the one or more processors 207 can render content in accordance with a default projector parameter stored in the memory 208. The one or more processors 207 can then cause the communication device 209 to transmit the rendered content to the projector.

In one or more embodiments, the identification system 217 and one or more processors 207 determine the companion device (100) is a wearable glass projection device when the display size is zero and the field of view is a non-zero value. When this occurs, the one or more processors 207 can render content in accordance with the field of view value and cause the communication device 209 to transmit the rendered content to the wearable glass projection device.

The identification system 217 and one or more processors 207 can also determine, in response to the communication device 209 receiving the extension (128) of the EDID (127) in response to the query, that the companion device (100) is the wearable glass projection device by extracting the field of view having the non-zero value from the extension (128) of the EDID (127). An example of EDID will be illustrated below with reference to FIG. 10. An example of an extension (128) of the EDID (127) will be described below with reference to FIG. 11.

In one or more embodiments, when the companion device (100) comprises augmented reality glasses, as would be the case if the companion device (100) were that of FIG. 1 above, the one or more processors 207 can render augmented reality content in accordance with the field of view extracted from the extension (128) of the EDID (127). The one or more processors 207 can then cause the communication device 209 to transmit the rendered augmented reality content to the augmented reality glasses.

The identification system 217 and one or more processors 207 can determine whether a companion device in communication with the communication device 209 is one of a monitor, projector, or wearable glass projection device in other ways as well. Illustrating by example, in one or more embodiments the identification system 217 and one or more processors 207 determine whether a companion device in communication with the communication device 209 is a monitor, projector, or wearable glass projection device by parsing a product identification code extracted from the EDID (127) received by the communication device 209 from the companion device in response to the query. The identification system 217 and one or more processors 207 can parse this product identification code, in one or more embodiments, by transmitting a field of view query comprising the product identification code to a remote electronic device, such as a server or computer, across a network. In response, the identification system 217 and one or more processors 207 can receive a field of view from the remote electronic device.

While field of view is a fantastic parameter to include in the extension (128) of the EDID (127), embodiments of the disclosure are not so limited. In other embodiments, a pixel density can be used in place of, or in combination with, the field of view. Accordingly, in one or more embodiments the identification system 217 and one or more processors 207 determine, in response to the communication device 209 receiving the extension (128) of the EDID (127) in response to the query, that the companion device is a wearable glass projection device by extracting a pixel density having a non-zero value from the extension (128) of the EDID (127). In one or more embodiments, the pixel density is expressed in pixels per degree.

In one or more embodiments, the identification system 217 is operable with the one or more processors 207. In some embodiments, the one or more processors 207 can control the identification system 217. In other embodiments, the identification system 217 can operate independently, delivering information gleaned from detecting multi-modal social cues, emotional states, moods, and other contextual information to the one or more processors 207. In one or more embodiments, the one or more processors 207 are configured to perform the operations of the identification system 217.

Other components 221 operable with the one or more processors 207 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as a loudspeaker disposed behind a speaker port or other alarms and/or buzzers and/or a mechanical output component such as vibrating or motion-based mechanisms.

The other components 221 can also include proximity sensors. The proximity sensors fall in to one of two camps: active proximity sensors and "passive" proximity sensors. Either the proximity detector components or the proximity sensor components can be generally used for gesture control and other user interface protocols.

The other components 221 can optionally include a barometer operable to sense changes in air pressure due to elevation changes or differing pressures of the electronic device 200. The other components 221 can also optionally include an environmental sensor 220 such as a light sensor that detects changes in optical intensity, color, light, or shadow in the environment of an electronic device. This can be used to make inferences about context such as weather or colors, walls, fields, and so forth, or other cues. An infrared sensor can be used in conjunction with, or in place of, the light sensor. The infrared sensor can be configured to detect thermal emissions from an environment about the electronic device 200. Similarly, a temperature sensor can be configured to monitor temperature about an electronic device.

A context engine 222 can then be operable with the various sensors to detect, infer, capture, and otherwise determine persons and actions that are occurring in an environment 213 about the electronic device 200. For example, where included one embodiment of the context engine 222 determines assessed contexts and frameworks using adjustable algorithms of context assessment employing information, data, and events. These assessments may be learned through repetitive data analysis. Alternatively, a user may employ a menu or user controls via the display 201 to enter various parameters, constructs, rules, and/or paradigms that instruct or otherwise guide the context engine 222 in detecting multi-modal social cues, emotional states, moods, and other contextual information. The context engine 222 can comprise an artificial neural network or other similar technology in one or more embodiments.

It is to be understood that in both FIG. 1 and FIG. 2, the elements illustrated are provided for illustrative purposes only in accordance with embodiments of the disclosure. Neither is intended to be a complete schematic diagram of the various components required. Therefore, other electronic devices in accordance with embodiments of the disclosure may include various other components obvious to those of ordinary skill in the art having the benefit of this disclosure, but not shown in FIG. 1 or FIG. 2, or may include a combination of two or more components or a division of a particular component into two or more separate components, and still be within the scope of the present disclosure.

Figure 3:
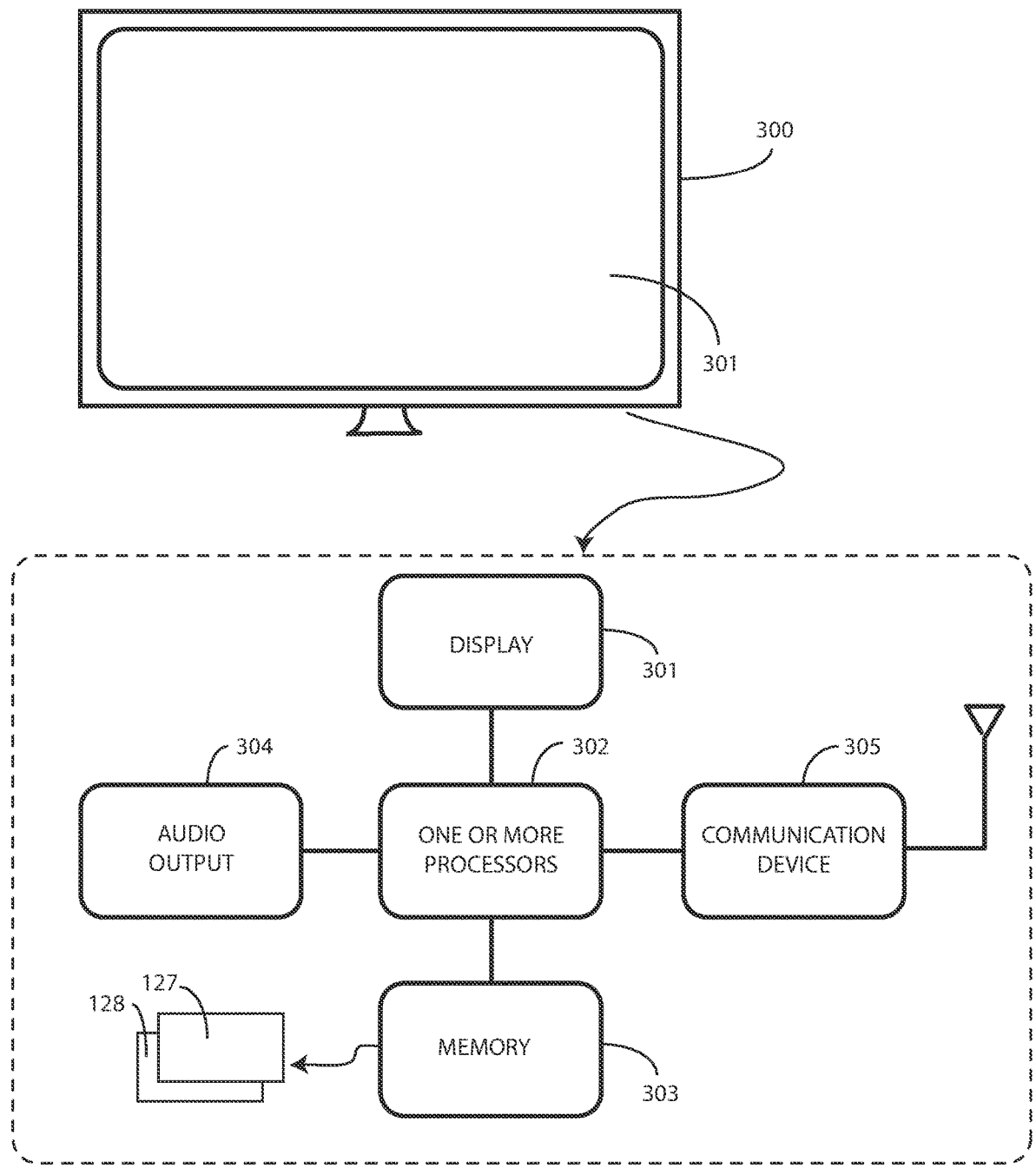
FIG. 3 illustrates another explanatory companion device in accordance with one or more embodiments of the disclosure.

Turning now to FIG. 3, illustrated therein is another explanatory companion device 300 operable with the electronic device (200) of FIG. 2. The companion device 300 of FIG. 3 is referred to as a "content presentation companion device" because it functions as a primary display for the electronic device (200). While a wearable glass projection device such as that shown in FIG. 1 can operate as a content presentation companion device, it can also operate as a supplemental content presentation companion device by presenting content in addition to that being presented by a content presentation companion device. An example of this will be illustrated and described below with reference to FIG. 5.

In this illustrative embodiment, the companion device 300 comprises a color video monitor. In other embodiments, the companion device 300 can take other forms. Illustrating by example, the content presentation companion device 300 can be a projector. In still other embodiments, the companion device 300 can be television, a computer display, a laptop display, a tablet computer, or a projector projecting content onto a screen. Other examples of content presentation companion devices 300 will be obvious to those of ordinary skill in the art having the benefit of this disclosure. Regardless of configuration, in one or more embodiments the companion device 300 includes one or more processors 302, a display 301, a memory 303, an audio output 304, and a communication device 305 capable of wired or wireless communication with an electronic device such as the electronic device (200) of FIG. 2.

In one or more embodiments, when coupled by either a wireless or wired connection to such an electronic device (200), the companion device 300 can function as a content presentation companion device by serving as the primary display for the electronic device (200). The electronic device (200) can receive content from a terrestrial broadcast network, cable television network, Internet streaming service, or combinations thereof, and redirect this content to the companion device 300 since its display 301 is larger than the display (201) of the electronic device (200). This allows people within the environment of the electronic device (200) or companion device 300 to more easily see the content. In one or more embodiments, content flows from the electronic device (200) to the companion device 300 through the communication device 305.

As will be described in more detail below with reference to the subsequent methods and method steps, the companion device 300 can establish, with the communication device 305, a wired electrical communication channel with the electronic device (200). Either automatically or, alternatively, in response to queries from the electronic device (200) transmit EDID 127 or an extension 128 of EDID 127 comprising one or more parameters regarding the companion device 300. Since the companion device 300 of FIG. 3 is a monitor, the display size of the EDID 127 would have a non-zero value while the field of view (or pixel density) of the extension 128 of the EDID 127 would have a zero value. By contrast, if the companion device 300 were a projector, the display size and the field of view would both be zero. As previously described, if the companion device 300 were instead the wearable glass projection device of FIG. 1, the field of view would be a non-zero value while the display size would be zero. In one or more embodiments, the field of view is expressed in degrees. If the pixel density is used in place of the field of view in the extension 128 of the EDID 127, in one or more embodiments the pixel density is expressed in pixels per degree.

The electronic device (200) would then render content in accordance with the metrics expressed and would transmit the rendered content to the companion device 300. Since this companion device 300 is a monitor, the one or more processors 302 would cause the rendered content to be presented on the display 301 to a user.

Figure 4:
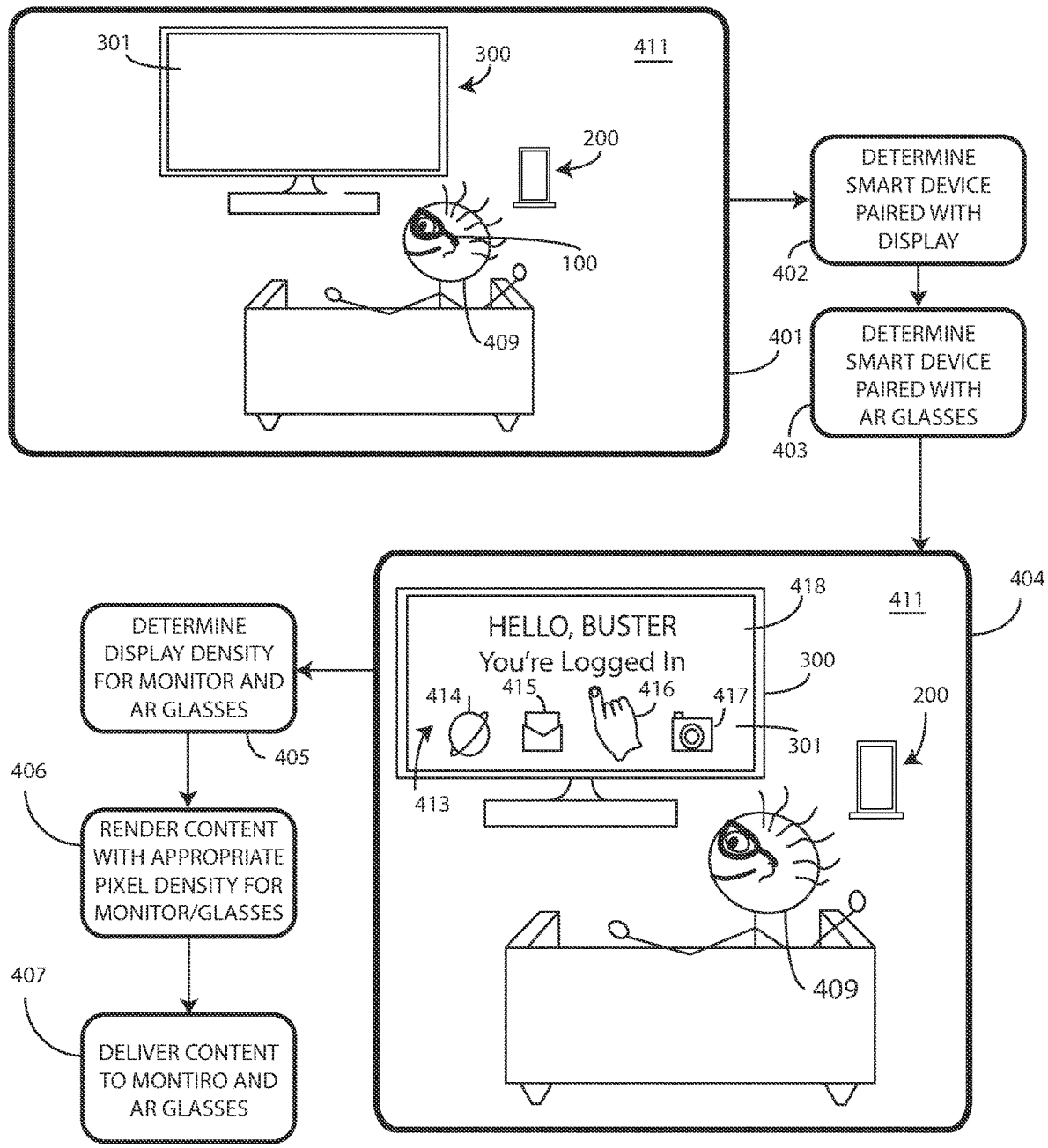
FIG. 4 illustrates one explanatory method in accordance with one or more embodiments of the disclosure.

Turning now to FIG. 4, illustrated therein one or more explanatory method steps illustrating how the companion device 100 of FIG. 1, the electronic device 200 of FIG. 2, and the companion device 300 of FIG. 3 can be used as a system. Beginning at step 401, the electronic device 200 is electronically in communication with both the companion device 300 of FIG. 3 and the companion device 100 of FIG. 1. When the electronic device 200 is electronically in communication with the companion device 300, this allows the electronic device 200 to use the larger display 301 of the companion device 300 to present content. This means that the companion device 300 of FIG. 3 is operating as a content presentation companion device.

Illustrating by example, in one or more embodiments the electronic device 200 can operate in a "desktop" mode by presenting a traditional computer user interface on the display 301 of the companion device 300. Alternatively, the electronic device 200 may present content such as videos, images, or other multimedia content on the display 301 of the companion device 300.

Embodiments of the disclosure contemplate that with the advanced computing power available in smartphones and other electronic devices, users often consume movies, videos, television shows, and other content using these devices. Additionally, they can perform work operations such as sending email, managing files, working on documents and spreadsheets, and so forth. By establishing an electronic communication channel between the electronic device 200 and the companion device 300, the processing power of the electronic device 200 can be leveraged to present content on the display 301 of the companion device 300. This allows a user to watch television, play video games, work on homework or office work, video call friends and family, or perform other tasks using the one or more processors (207) of the electronic device 200 combined with the large display 301 of the companion device 300.

As shown at step 401, while the electronic device 200 is in electronic communication with the companion device 300, the electronic device 200 is not yet presenting content on the display 301 of the companion device 300. However, a person 409 is situated within an environment 411 of the electronic device 200. In this illustrative embodiment, the electronic device 200 supports multiple users, each of whom can use the electronic device 200 by accessing a personal user account using personalized login credentials.

Illustrating by example, when a first person is using the electronic device 200, the first person can login to the electronic device 200 by entering a login credential to access their applications, music library, video library, photo library, and files. When a second person wants to use the electronic device 200, the user profile can change to that of the second person when the second person enters their login credential. This allows the first person and the second person, by using their unique login credential, to each login to their user account to see their own user profile exclusively without the clutter or distraction of others user profiles, and so forth.

At step 402, one or more processors (207) of the electronic device 200 first determine that the electronic device 200 is electronically in communication with the companion device 300. This determination can optionally include determining that the one or more processors (207) are using the display 301 of the companion device 300 as a primary display for the electronic device 200, which results in companion device 300 operating as a content presentation companion device.

In this illustrative example, to better illustrate how the identification system (217) of the electronic device 200 works, at step 403 the one or more processors (207) additionally determine that the electronic device 200 is electronically in communication with companion device 100, which is a wearable glass projection device.

Since the electronic device 200 supports multiple user accounts that can be accessed with corresponding login credentials, in one or more embodiments the one or more processors (207) determine whether the person 409 operating companion device 100 has a login credential allowing access to the electronic device 200. Where they do, the one or more processors (207) of the electronic device automatically choose the login credential belonging to the user operating the augmented reality companion device 100 and automatically log that person into the electronic device 200. The person 409 is shown as being logged in at step 404.

In this illustration, both the person 409 has a user account on the electronic device 200. Accordingly, the one or more processors (207) automatically log into an account profile of the electronic device 200 associated with the person 409 using the selected login credential.

As shown at step 405, this automatic login action has logged the person 409, Buster, into the electronic device 200. Accordingly, the display 301 of the companion device 300 becomes the primary display for the electronic device 200 by presenting content 413. In this illustration, the content 413 comprises a desktop mode with a welcome banner 418 and a plurality of user actuation targets 414,415, 416,417 associated with one or more applications. By toggling one of the user actuation targets 414,415,416,417, the person 409 can actuate an application.

To present content, the electronic device 200 must render content for companion device 300 and companion device 100 differently. Embodiments of the disclosure contemplate that the specifications differ between companion device 300 and companion device 100. Companion device 300 may have a non-zero display size but is generally not thought of as having a "field of view." Instead, companion device 300 is specified as having a length and width selected for a person 409 who is seated approximately four to eight feet from companion device 300, as shown in FIG. 4.

The same cannot be said for companion device 100, which is a wearable glass projection device (in this example, an augmented reality companion device). What the person 409 sees is neither related to the physical size of the image generation component or a viewing area that is visible by the user. Instead, embodiments of the disclosure find it far more favorable to speak of specifications for companion device 100 in terms of field of view or pixel density.

Accordingly, embodiments of the disclosure advantageously provide a two-specification "code" that allows the electronic device 200 to quickly, efficiently, and automatically determine the type of companion device with which it is communicating. Illustrating by example, in one or more embodiments one or more processors (207) of the electronic device 200 determine that companion device 300 is a monitor anytime the display size received in EDID (127) has a non-zero value. By contrast, the one or more processors (207) determine that companion device 100 is a wearable glass projection device when the display size is zero and the field of view is a non-zero value.

Specifically, at step 405 the communication device (209) of electronic device queries companion device 300 and companion device 100 for a companion device type. Step 405 can occur in a variety of ways.

Figure 7:
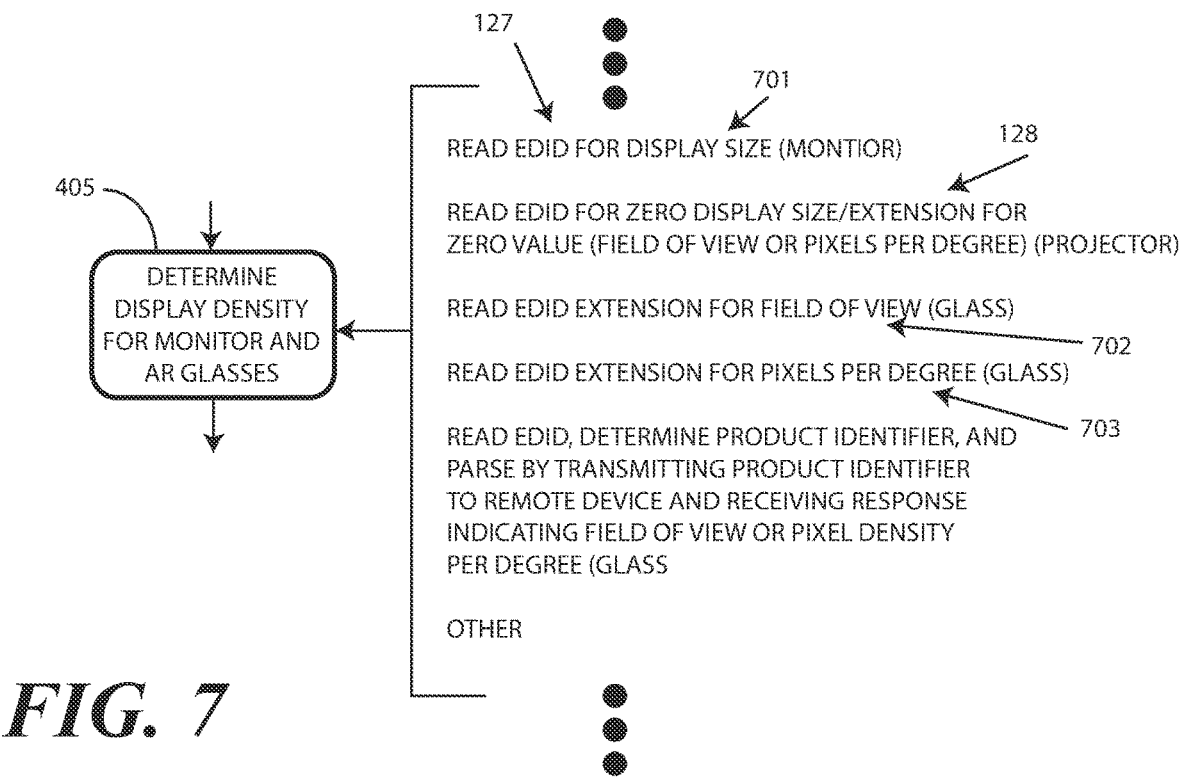
FIG. 7 illustrates one or more method steps in accordance with one or more embodiments of the disclosure.

Turning briefly to FIG. 7, illustrated therein are some of the various ways in which step 405 of FIG. 4 can occur. In one or more embodiments, step 405 comprises receiving, with the communication device (209), an extension 128 of the EDID 127 comprising one or more of a display size 701, a field of view 702, and/or a pixel density 703.

Step 405 comprises determining, with one or more processors (207), that companion device 300 is a monitor because the display size 701 is a non-zero value and the field of view 702 and/or pixel density 703 is a zero value. Step 405 comprises determining that a companion device is a projector when both the display size 701 and the field of view 702 and/or pixel density 703 are all zero.

Step 405 comprises determining that the companion device (100) is a wearable glass projection device when the field of view 702 or the pixel density 703 has a non-zero value and the display size 701 has a zero value. Step 405 can identify any device parsing a product identification code from the EDID 127. In one or more embodiments, this parsing of the product identification code comprises transmitting a query comprising the product identification code to a remote electronic device and receiving one or both of a display size 701 and/or field of view 702 or pixel density 703 from the remote electronic device in response. The same logic can then be used to identify the companion device from this received information. What's more, using the parsing of the product identification code, step 405 can determine whether a glass device is an augmented reality companion device, a virtual reality companion device, or another type of wearable glass projection device.

As explained, in one or more embodiments a companion device delivers the identity of the companion device using a modified EDID communication. In one or more embodiments, this modified EDID communication comprises the transmission of EDID 127 in an EDID file structure along with an extension 128 of the EDID 127.

Turning briefly to FIG. 10, illustrated therein is an EDID file structure 1000 suitable for delivering EDID 127. The EDID file structure 1000 is a standardized communication protocol that allows a display to inform a source as to the operating capabilities it possesses. Using the EDID file structure 1000, a companion device can inform a source device regarding operating characteristics such as native resolution, display size, aspect ratio, color definition, and other supported features. The EDID file structure 1000 can even identify the manufacturer and serial number of the content presentation companion device. The manufacturer and serial number are examples of product identification codes.

Communication of the EDID file structure 1000 allows a source device to configure the content it delivers to the content presentation companion device without the user having to manually configure the same. Additionally, the EDID file structure 1000 reduces the chance for the content being transmitted incorrectly from the source device to the content presentation companion device. Developed by the Video Electronic Standards Association (VESA), the EDID file structure 1000 allows for far more information to be delivered from a content presentation companion device to a source device than, for example, having dedicated pins attempt to carry information using binary signals. In one or more embodiments.

The EDID file structure 1000 defines a 128-byte data structure that includes manufacturer and operation-related data. As shown in FIG. 10, this information includes a vendor/product identification block, an EDID structure version and revision, basic display parameters and features, color characteristics, established timings, standard timing information, and detailed timing descriptions.

Relevant to embodiments of the disclosure, the EDID file structure 1000 also allows for an extension flag 1001. The extension flag 1001, when set, indicates that an extension, which is an additional 128-byte block of data, will be included with the EDID file structure 1000 to describe increased capabilities. Such an EDID extension is used in accordance with one or more embodiments of the disclosure. When combined the logic described above (and in further detail below with reference to FIG. 8), the combined EDID file structure 1000 and EDID extension data can be used to determine if a companion device is a monitor, a projector, or a wearable glass projection device.

Turning now to FIG. 11, illustrated therein is one explanatory extension 128 of EDID configured in accordance with one or more embodiments of the disclosure. As shown, the extension 128 of the EDID includes a payload field 1101 comprising a field of view or pixel density metric.

Turning now back to FIG. 4, in this example step 405 comprises the one or more processors (207) determining that companion device 100 is a wearable glass projection device because the display size is zero and the field of view and/or pixel density is a non-zero value. Step 405 can also comprise determining that companion device 300 is a monitor when the display size is a non-zero value and the field of view and/or pixel density is a zero value.

Step 406 then comprises rendering, with the one or more processors (207) content for companion device 300 in accordance with the display size. Step 406 comprises rendering content for companion device 100 in accordance with the field of view and/or pixel density. Since companion device 100 comprises augmented reality glasses in this example, step 406 comprises rendering, with the one or more processors (207) augmented reality content in accordance with the field of view and/or pixel density to create rendered augmented reality content. Step 407 then comprises the electronic device 200 transmitting, with the communication device (209), the rendered content to companion device 300 and the rendered augmented reality content to companion device 100.

As shown in FIG. 4, when the companion device is a monitor, the one or more processors (207) can render content in accordance with the display size and can cause the communication device (209) to transmit the rendered content to the monitor. When the companion device is a projector, the one or more processors (207) can render content in accordance with a default projector parameter and transmit the rendered content to the projector. Similarly, if the companion device is a wearable glass projection device, the one or more processors (207) can determine whether the wearable glass projection device is an augmented reality companion device or a virtual reality companion device. The one or more processors (207) can render augmented reality content in accordance with the field of view and/or pixel density and can cause the communication device 209 to transmit the rendered augmented reality content to companion device 100. The result of these method steps is that content is rendered perfectly, automatically, on both companion device 300 and via companion device 100, as shown in FIG. 5.

Figure 5:
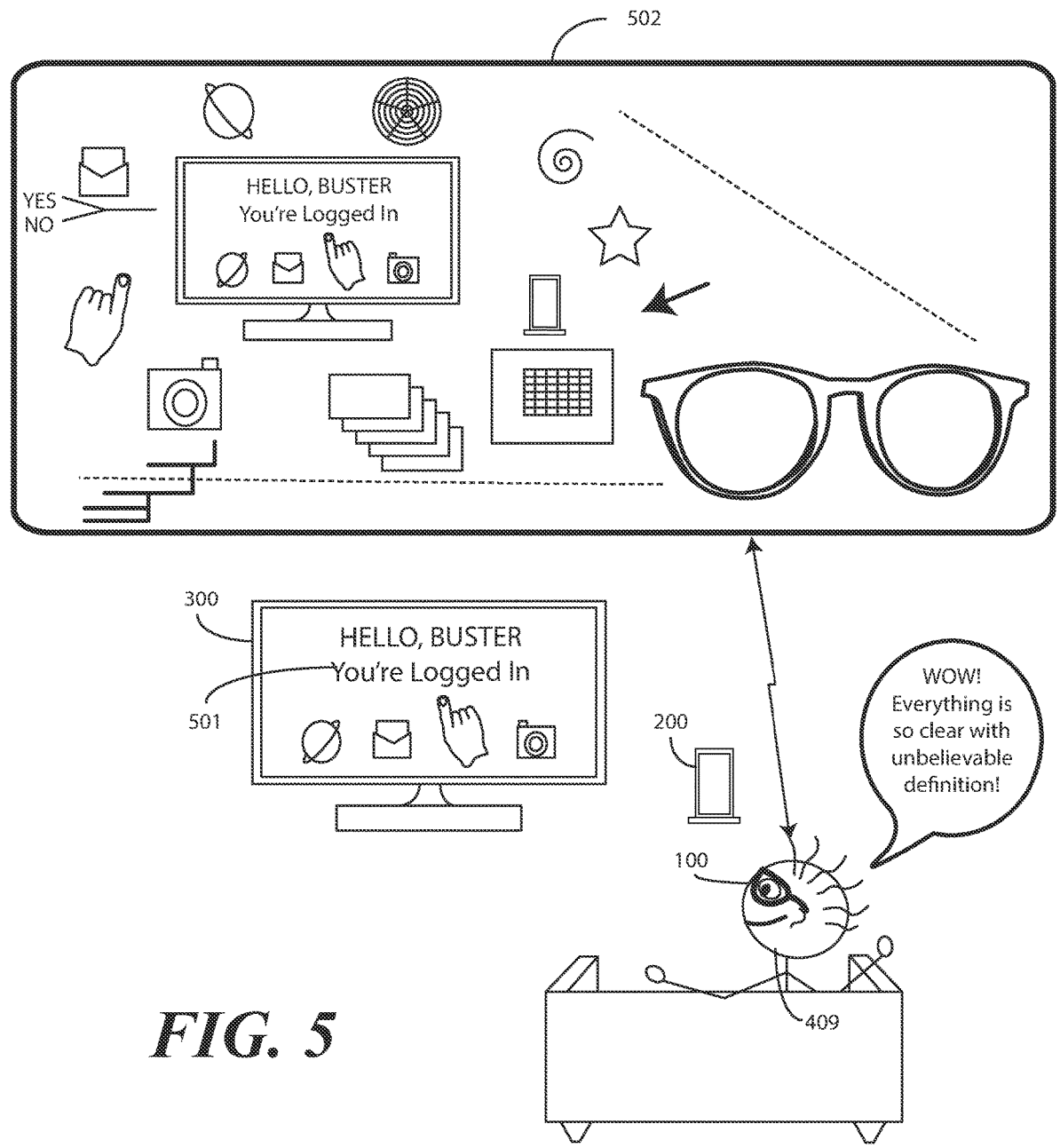
FIG. 5 illustrates one or more explanatory method steps in accordance with one or more embodiments of the disclosure.

Turning now to FIG. 5, illustrated therein is our person 409 viewing rendered content 501 generated by the electronic device 200 and delivered to companion device 300. The person 409 is also viewing rendered augmented reality content 502 generated by the electronic device and delivered to companion device 100.

As shown, the one or more processors (207) of the electronic device 200 have rendered content in accordance with the field of view or pixel density defined by the non-zero value found in the extension (128) of the EDID (127) to create rendered augmented reality content 502. The one or more processors (207) have also caused the communication device (209) to transmit the rendered augmented reality content 502 to companion device 100 so that the person 409 can see the same.

In a similar manner, the one or more processors (207) of the electronic device 200 have rendered content in accordance with the display size found in the EDID (127) to create rendered content 501 for companion device 300. The one or more processors (207) have also caused the communication device (209) to transmit the rendered content 501 to companion device 300 for presentation.

In this example, the rendered augmented reality content 502 defines an augmented reality environment. Within the virtual reality environment are presented a plurality of virtual elements. Each virtual element represents an application, widget, button, control, or other user actuation target the person 409 may select to launch corresponding applications, control hardware, and/or explore other portions of the augmented reality environment.

In one or more embodiments, each virtual element represents one or more content offerings available to be shared with the one or more remote electronic devices. This plurality of content offerings can comprise one or more of an application actively operating on the one or more processors (207) of the electronic device 200, a tab of a web browser, an image of a display of the electronic device 200, a file manager, or an application window. Other examples of potential content offerings suitable for inclusion with the content verification presentation will be obvious to those of ordinary skill in the art having the benefit of this disclosure.

As shown in FIG. 5, the carousel presentation defines a ring at least partially encircling the view of companion device 300, as seen through companion device 100. In one or more embodiments, the carousel presentation causes the augmented reality images defining each virtual element to encircle the view of companion device 300. However, other configurations for the carousel presentation can occur as well. Illustrating by example, the carousel presentation could cause the augmented reality images defining each virtual element to define a square about the view of companion device 300. Alternatively, the carousel presentation may be omitted, with the augmented reality images defining each virtual element being presented above, to the side, or below the view of companion device 300.

Figure 6:
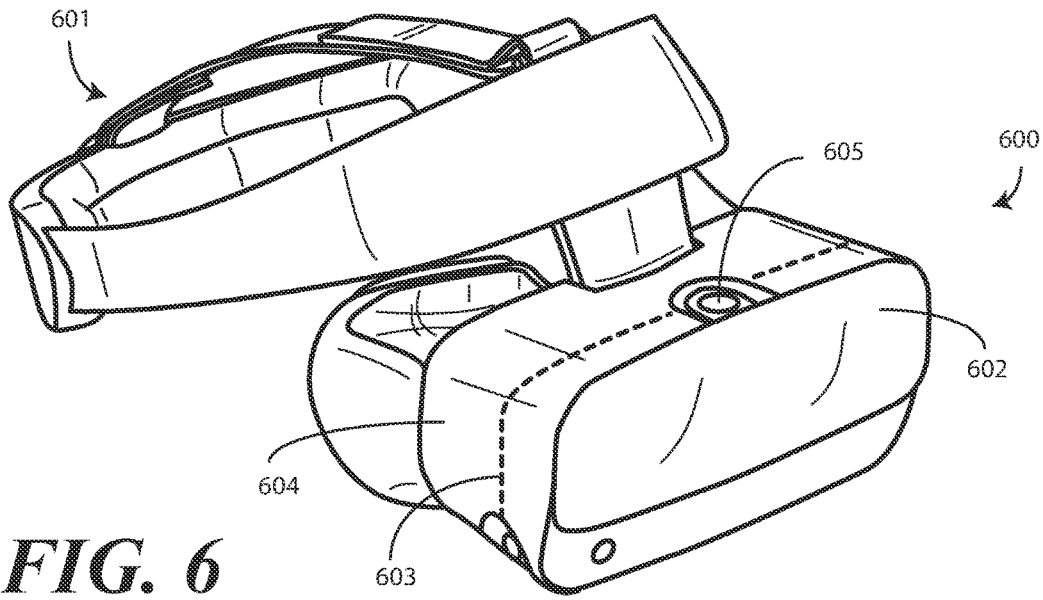
FIG. 6 illustrates still another explanatory companion device in accordance with one or more embodiments of the disclosure.

To this point, the illustrative wearable glass projection device has been an augmented reality companion device. However, embodiments are not so limited. Indeed, the field of view and/or pixel density metric found in the extension of the EDID can be used to render content for a virtual reality companion device as well. Turning now to FIG. 6, illustrated therein is one such virtual reality companion device.

While the companion device (100) of FIG. 1 was an augmented reality companion device, the companion device 600 of FIG. 6 is a "virtual" reality companion device. As with the augmented reality companion device of FIG. 1, the virtual reality companion device of FIG. 6 is configured as a headwear device that can be worn by a user.

In this illustrative embodiment, the companion device 600 includes a head receiver 601. The head receiver 601 is to receive a user's head. When the user desires to don the companion device 600, they place their head into the head receiver 601. The head receiver 601 can be adjustable to accommodate different sizes of heads. While the head receiver 601 is shown illustratively as a headband and overhead strap combination, it can take other forms as well, including structural shapes such as a cap, hat, helmet, or other head-covering device.

The companion device 600 also includes a shield 602 to block light from entering a virtual reality cabin positioned around the eyes of a wearer. In one or more embodiments, a virtual reality display is positioned behind this shield 602. In one embodiment, the shield 602 is manufactured from an opaque material, such as an opaque thermoplastic material.

In this illustrative embodiment, the shield 602 is coupled directly to the head receiver 601. However, other configurations will be obvious to those of ordinary skill in the art having the benefit of this disclosure. Illustrating by example, the shield 602 can be pivotally coupled to the head receiver 601 such that it can be moved between a first position relative to the head receiver 601 and a second position that is angularly displaced about the head receiver 601 relative to the first position. In still other embodiments, the shield 602 can be coupled to the head receiver 601 by way of a track. Other configurations and coupling schemes will be obvious to those of ordinary skill in the art having the benefit of this disclosure.

In one or more embodiments, a holographic optical element 603 is positioned within the virtual reality cabin positioned around the user's eyes. In one or more embodiments, the holographic optical element 603 is translucent such that ambient light can pass therethrough. The holographic optical element 603 can be any of a lens, filter, beam splitter, diffraction grating, or other device capable of reflecting light received along the interior of the virtual reality cabin to create holographic images. In one illustrative embodiment, the holographic optical element 603 comprises a pellucid holographic lens that is either integral to, or coupled to, the shield 602. Other examples of holographic optical elements will be obvious to those of ordinary skill in the art having the benefit of this disclosure.

Electronic components, many of which were described with reference to the block diagram schematic (125) of FIG. 1, can be integrated into companion device 600. Accordingly, in such embodiments the companion device 600 can include a display and corresponding electronics or alternatively a pair of displays, e.g., a left display and a right display. The display can optionally include a projector as previously described. Where a single display is used, it can of course present multiple images to the user at the same time (one for each eye). To provide a richer virtual reality experience, different information or content can be delivered to each of the user's eyes.

In one or more embodiments, the virtual reality cabin also includes one or more optical lenses situated therein. In one or more embodiments, the one or more optical lenses can bend light to make it easier for the user's eyes to see. Additionally, where multiple images are presented to the user at the same time, the one or more optical lenses can help segregate this content so that the proper content reaches the proper eye without interference from content intended for the other eye. In one embodiment, the one or more optical lenses comprise Fresnel lenses. In another embodiment, the one or more optical lenses comprise hybrid Fresnel lenses. Other types of lenses will be obvious to those of ordinary skill in the art having the benefit of this disclosure.

In one or more embodiments, a virtual reality cabin perimeter material 604 extends distally from the shield 602 to prevent ambient light from passing to the eyes of a user. This material works to ensure that the minimum quantity of exterior light reaches the user's eyes when operating as a virtual reality headset. The material can also work to improve the user experience by reducing noise introduced by ambient light interfering with the images presented by the display of the companion device 600. Moreover, the display of the companion device 600 can operate at a lower brightness, thereby conserving power when the material is in place. The material can optionally be detachable for cleaning or other operations.

The companion device 600 can optionally include integrated electronics as well. Accordingly, the head receiver 601 or another part of the companion device 600 can comprise one or more electrical components. Some of these electrical components were described above in FIG. 1. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors (111). The one or more processors (111) can be operable with a memory (112). The one or more processors (111), which may be any of one or more microprocessors, programmable logic, application specific integrated circuit device, or other similar device, are capable of executing program instructions and methods. The program instructions and methods may be stored either on-board in the one or more processors (111), or in the memory (112), or in other computer readable media coupled to the one or more processors (111).

In one or more embodiments, the companion device 600 also includes an optional wireless communication device (113). Where included, the wireless communication device (113) is operable with the one or more processors (111) and is used to facilitate electronic communication with one or more electronic devices or servers or other communication devices across a network. Note that it is possible to combine the one or more processors (111), the memory (112), and the wireless communication device (113) into a single device, or alternatively into devices having fewer parts while retaining the functionality of the constituent parts.

A battery or other energy storage device can be included to provide power for the various components of the companion device 600. Again, it will be obvious to those of ordinary skill in the art having the benefit of this disclosure that other energy storage devices can be used instead of the battery, including a micro fuel cell or an electrochemical capacitor. The battery can include a lithium-ion cell or a nickel metal hydride cell, such cells having sufficient energy capacity, wide operating temperature range, large number of charging cycles, and long useful life. The battery may also include overvoltage and overcurrent protection and charging circuitry. In one embodiment, the battery comprises a small, lithium polymer cell.

Other components (116) can be optionally included in the companion device 600 as well. For example, in one embodiment one or more microphones can be included as audio capture devices. These audio capture devices can be operable with the one or more processors (111) to receive voice input. Additionally, in one or more embodiments the audio capture device can capture ambient audio noise and cancel it out. In one or more embodiments, the audio capture device can record audio to the memory (112) for transmission through the wireless communication device (113) to a server complex across a network.

The other components (116) can also include a motion generation device for providing haptic notifications or vibration notifications to a user. For example, a piezoelectric transducer, rotational motor, or other electromechanical device can be configured to impart a force or vibration upon the head receiver 601. The motion generation device can provide a thump, bump, vibration, or other physical sensation to the user. The one or more processors (111) can be configured to actuate the motion generation device to deliver a tactile or vibration output alone or in combination with other outputs such as audible outputs.

Similarly, in one or more embodiments the eyewear can include a video capture device such as an imager. In one or more embodiments, the video capture device can function as a to detect changes in optical intensity, color, light, or shadow in the near vicinity of the companion device 600. Other optional components include a global positioning system device for determining where the companion device 600 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

An optional user interface 605 can be included. The user interface 605 can be used, for example, to activate the circuit components or turn them OFF and so forth. The user interface 605, where included, can be operable with the one or more processors (111) to deliver information to, and receive information from, a user. The user interface 605 can include a rocker switches, slider pad, button, touch-sensitive surface, or other controls, and optionally a voice command interface. These various components can be integrated together.

In one or more embodiments, an audio output device (120), such as a loudspeaker or other transducer, can deliver audio output to a user. For example, piezoelectric transducers can be operably disposed within the head receiver. Actuation of the piezoelectric transducers can cause the same to vibrate, thereby emitting acoustic output. More traditional audio output devices (117), such as loudspeakers, can be used as well.

Sensor circuits of the companion device 600 can also include motion detectors, such as one or more accelerometers, gyroscopes, magnetometers, and/or inertial motion units. For example, an accelerometer may be used to show vertical orientation, constant tilt and/or whether the companion device 600 is stationary. A gyroscope can be used in a similar fashion. The motion detectors can also be used to determine the spatial orientation of the companion device 600 as well in three-dimensional space by detecting a gravitational direction. In addition to, or instead of, an accelerometer and/or gyroscope, an electronic compass can be included to detect the spatial orientation of the companion device 600 relative to the earth's magnetic field. Similarly, the gyroscope can be included to detect rotational motion of the companion device 600 in three-dimensional space.

The companion device 600 of FIG. 6 can operate as a stand-alone electronic device in one or more embodiments, such as when it includes a display and other corresponding electronic components as noted above. However, in other embodiments, the companion device 600 can operate in tandem with a portable electronic device, such as a smartphone or computer, to form a combined headwear/eyewear system.

The distinction between the companion device (100) of FIG. 1 and the companion device 600 of FIG. 6 is that the companion device 600 of FIG. 6 presents images to a user's eyes solely using components of the companion device 600 and without the addition of light from the physical environment. However, the components of the companion device 600 still have a field of view or pixel density associated therewith. Consequently an electronic device in communication with the companion device 600 can render content using the field of view or pixel density as previously described.

Figure 8:
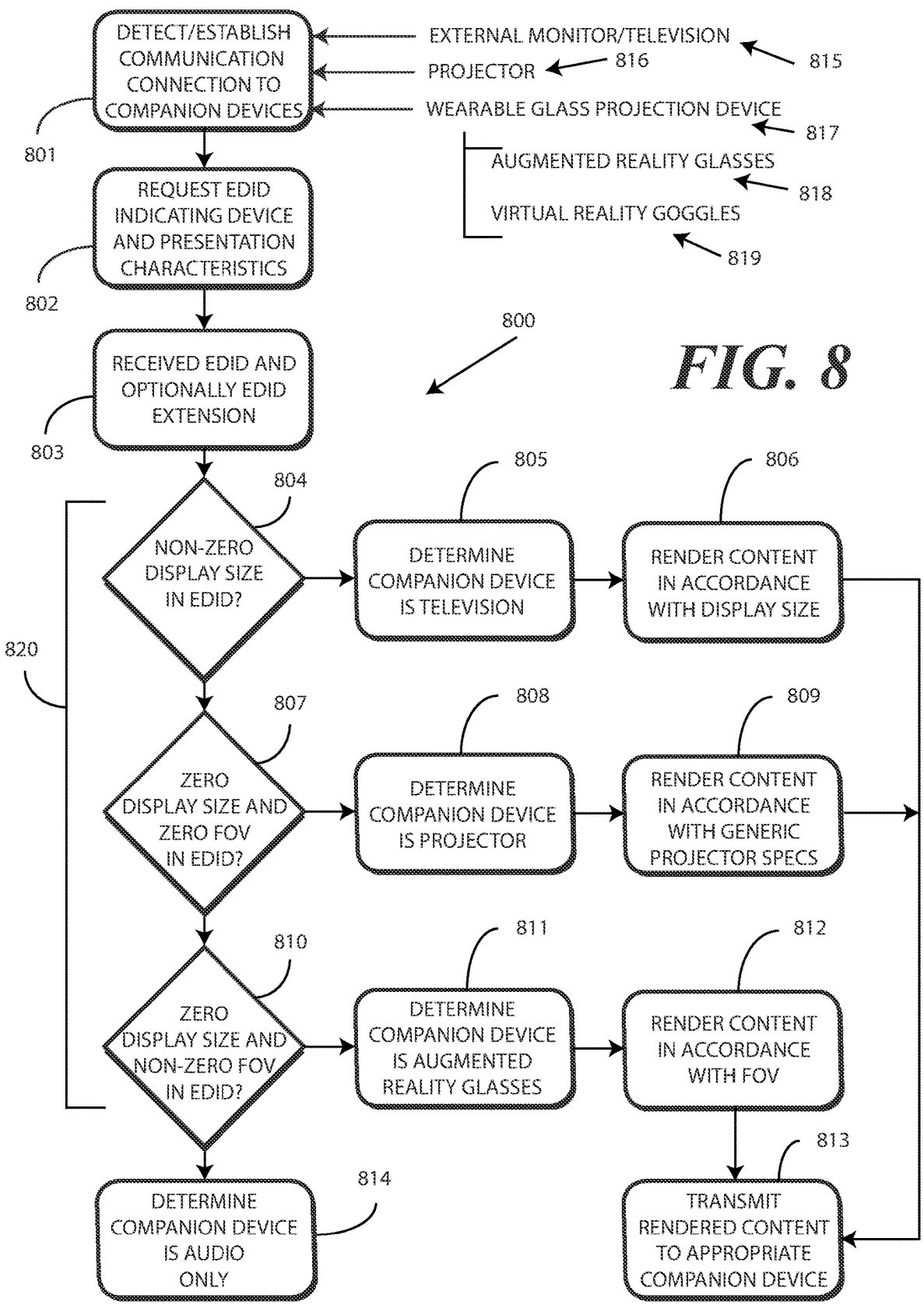
FIG. 8 illustrates another explanatory method in accordance with one or more embodiments of the disclosure.

Turning now to FIG. 8, illustrated therein is one explanatory method 800 in accordance with one or more embodiments of the disclosure. The method 800 of FIG. 8 allows an electronic device comprising a wireless communication device and one or more processors operable with the wireless communication device to identify a companion device electronically in communication with the wireless communication device as being one of a monitor, a projector, or a wearable glass projection device. One or more processors of the electronic device can identify a companion device electronically in communication with the wireless communication device as being a wearable glass projection device when a received EDID extension includes a non-zero field of view or pixel density.

When the wearable glass projection device comprises augmented reality glasses, the method 800 renders augmented reality content with a number of pixels per degree defined by the non-zero field of view to create rendered augmented reality content. The method 800 then causes the wireless communication device to transmit the rendered augmented reality content to the augmented reality glasses.

Beginning at step 801, an electronic device establishes, with a communication device, a wired electrical communication channel with a companion device. The companion device could be a monitor 815, a projector 816, or a wearable glass projection device 817, examples of which include augmented reality glasses 818 and virtual reality goggles 819.

At step 802, the method 800 queries, using the communication device, the companion device for a companion device type. At step 803, the method 800 receives, with the communication device, EDID. In one or more embodiments, the EDID includes an EDID extension. In one or more embodiments, the EDID extension comprises one of a field of view or a pixel density. In one or more embodiments, the EDID extension comprises a field of view expressed in degrees. In other embodiments, the EDID extension comprises the pixel density expressed in pixels per angle of degree.

At decision tree 820, the method 800 determines, using one or more processors of an electronic device, whether the companion device is the monitor 815, the projector 816, or the wearable glass projection device 817. Beginning at decision 804, the method 800 determines whether the display size included with the EDID is a non-zero value. Where it is, step 805 determines that the companion device is the monitor 815. Step 806 then comprises rendering content in accordance with the display size. Step 813 then comprises causing a communication device to transmit the rendered content to the monitor 815.

Decision 807 comprises determining whether the display size of the EDID and the field of view or pixel density of the EDID extension are both zero. Where they are, step 808 determines that the companion device is a projector 816. Step 809 then comprises rendering content in accordance with a default projector parameter. Step 813 then comprises causing a communication device to transmit the rendered content to the projector 816.

Decision 810 comprises determining whether the display size of the EDID is zero and the field of view or pixel density of the EDID extension is a non-zero value. Where this is the case, step 811 comprises determining that the companion device is a wearable glass projection device 817. Step 812 comprises rendering, with one or more processors, content in accordance with the field of view or pixel density extracted from the EDID extension. This rendering can be done regardless of whether the wearable glass projection device 817 is an augmented reality companion device or a virtual reality companion device in one or more embodiments. Step 813 comprises transmitting the rendered content to the wearable glass projection device 817.

When the decision tree fails to identify a monitor 815, projector 816, or wearable glass projection device 817, step 814 determines that the companion device is an audio only device. Audio content can be transmitted to the audio only device at step 814.

Figure 12:
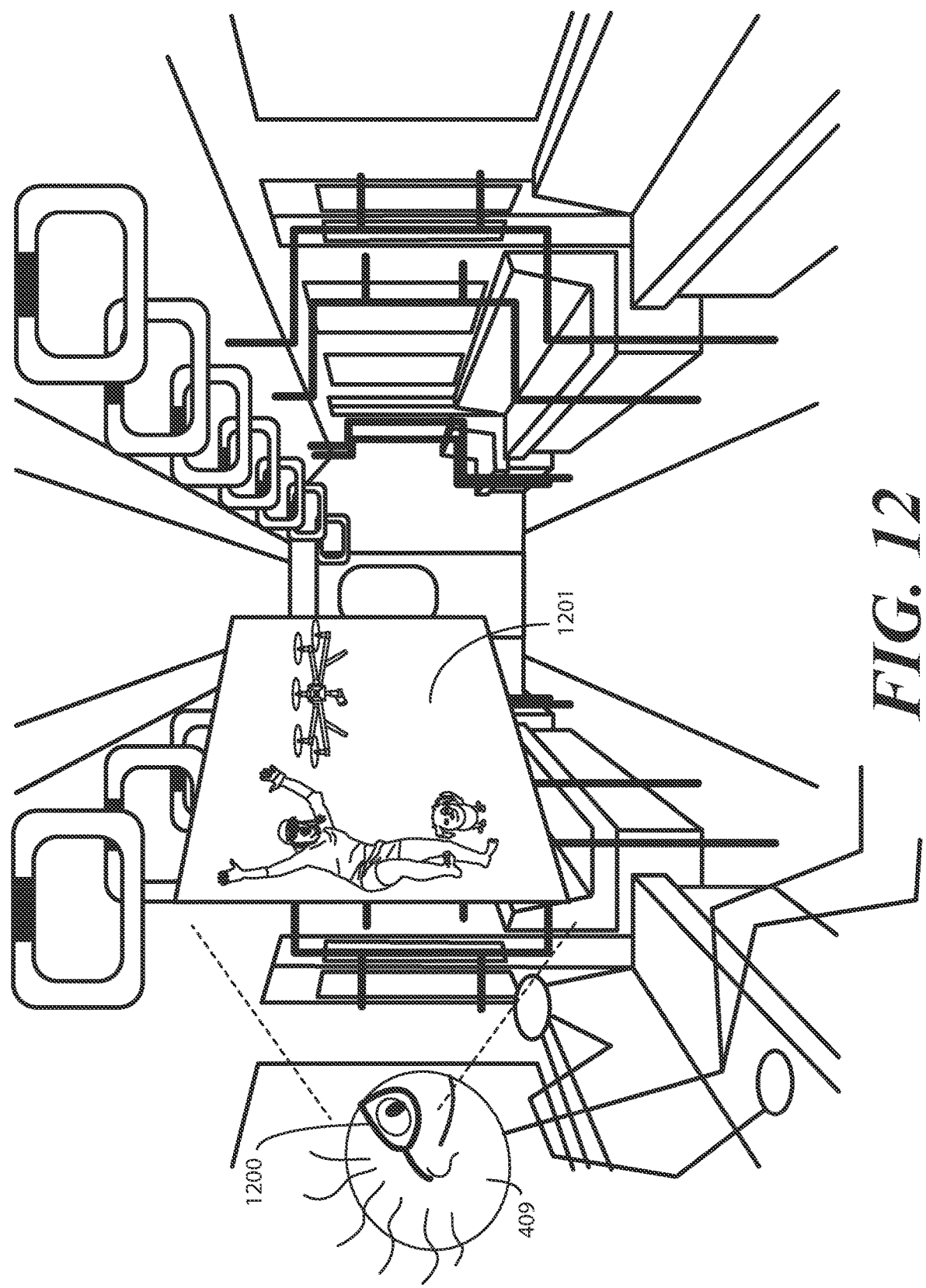
FIG. 12 illustrates a one explanatory application for embodiments of the disclosure.

The method 800 allows perfectly rendered content to be delivered to a wearable glass projection device for the enjoyment thereof by a user. Illustrating by example, turning briefly to FIG. 12, illustrated therein is our person 409 wearing augmented reality glasses 1200 electronically in communication with the electronic device (200) of FIG. 2 (which is in his pocket). As shown, the augmented reality glasses 1200 allow the person 409 to watch a movie 1201 that is perfectly rendered using a field of view or pixel density extracted from an EDID extension while in the constrained environment of a train. The method (800) of FIG. 8 facilitates this "on the go" consumption of content that is perfectly rendered.

Figure 9:
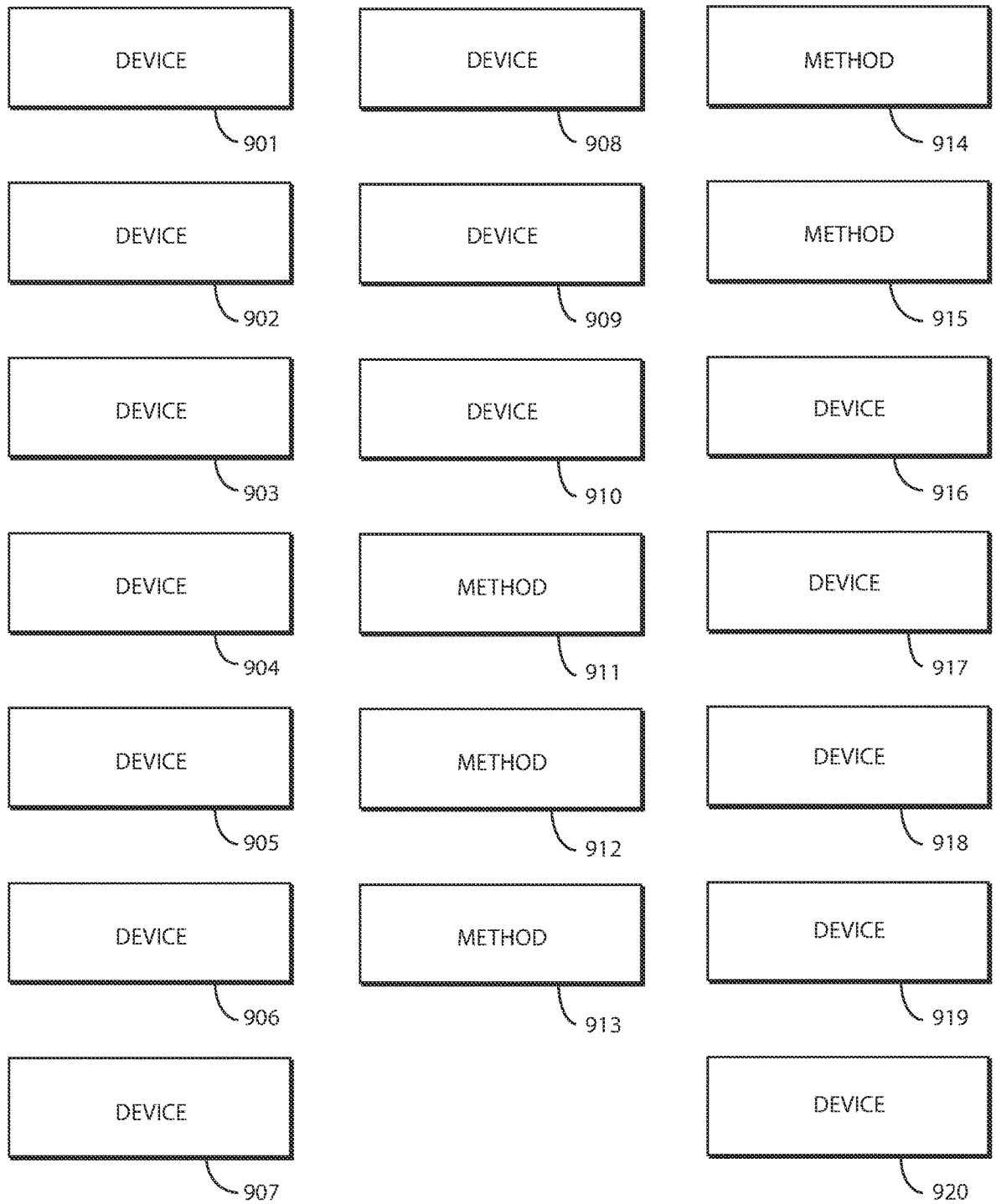
FIG. 9 illustrates one or more embodiments of the disclosure.

Turning now to FIG. 9, illustrated therein are various embodiments of the disclosure. The embodiments of FIG. 9 are shown as labeled boxes in FIG. 9 due to the fact that the individual components of these embodiments have been illustrated in detail in FIGS. 1-8, which precede FIG. 9. Accordingly, since these items have previously been illustrated and described, their repeated illustration is no longer essential for a proper understanding of these embodiments. Thus, the embodiments are shown as labeled boxes.

At 901, an electronic device comprises a communication device and one or more processors operable with the communication device. At 901, the one or more processors cause, in response to the communication device detecting establishment of an electrical communication channel with a companion device, the communication device to query the companion device to determine whether the companion device is a projector, a monitor, or a wearable glass projection device.

At 902, the one or more processors of 901 determine, in response to the communication device receiving EDID and an extension of the EDID in response to the query, whether the companion device is the projector, the monitor, or the wearable glass projection device by extracting a display size from the EDID and a field of view from the extension of the EDID.

At 903, the one or more processors of 902 determine the companion device is the monitor when the display size is a non-zero value. At 904, the one or more processors of 903 further render content in accordance with the display size and causing the communication device to transmit rendered content to the monitor.

At 905, the one or more processors of 903 determine the companion device is the projector when the display size and the field of view are both zero. At 906, the one or more processors of 905 further render content in accordance with a default projector parameter and causing the communication device to transmit rendered content to the projector.

At 907, the one or more processors of 903 determine the companion device is the wearable glass projection device when the display size is zero and the field of view is a non-zero value. At 908, the one or more processors of 901 determine, in response to the communication device receiving an extension of the EDID in response to the query, that the companion device is the wearable glass projection device by extracting a field of view having a non-zero value from the extension of the EDID.

At 909, the wearable glass projection device of 908 comprises augmented reality glasses. At 909, the one or more processors further render augmented reality content in accordance with the field of view and cause the communication device to transmit rendered augmented reality content to the augmented reality glasses.

At 910, the one or more processors of 908 determine whether the companion device is the monitor, the projector, or wearable glass projection device by parsing a product identification code from EDID received by the communication device from the companion device in response to the query. At 911, the one or more processors of 910 parse the product identification code by transmitting a field of view query comprising the product identification code to a remote electronic device and receiving the field of view from the remote electronic device in response.

At 912, the one or more processors of 901 determine, in response to the communication device receiving an extension of the EDID in response to the query, that the companion device is the wearable glass projection device by extracting a pixel density having a non-zero value from the extension of the EDID. At 913, the pixel density of 912 is expressed in pixels per degree.

At 914, a method in an electronic device comprises establishing, with a communication device, a wireless electrical communication channel with a companion device. At 914, the method comprises querying, with the communication device, the companion device for companion device type.

At 914, the method comprises receiving, with the communication device, an EDID extension comprising one of a field of view or a pixel density. At 914, the method comprises determining, with one or more processors operable with the communication device, that the companion device consists of a wearable glass projection device when the one of the field of view or the pixel density has a non-zero value.

At 915, the one of the field of view or pixel density of 914 comprises the field of view and is expressed in degrees. At 916, the one of the field of view or the pixel density of 914 comprises the pixel density and is expressed in pixels per angle of degree.

At 917, the wearable glass projection device of 914 comprises augmented reality glasses. At 917, the method further comprises, when the one of the field of view or the pixel density has the non-zero value, rendering, with the one or more processors, augmented reality content in accordance with the one of the field of view or the pixel density to create rendered augmented reality content. At 917, the method comprises transmitting, with the communication device, the rendered augmented reality content to the augmented reality glasses.

At 918, the method of 914 further comprises receiving, with the communication device, EDID comprising a display size with the EDID extension. At 918, the method comprises determining, with one or more processors, that the companion device consists of a monitor when the display size has another non-zero value. At 918, the method comprises determining, with the one or more processors, that the companion device consists of a projector when both the display size and the one of the field of view or the pixel density is zero.

At 919, an electronic device comprises a wireless communication device. At 919, the electronic device comprises one or more processors operable with the wireless communication device. At 919, the one or more processors identify a companion device electronically in communication with the wireless communication device as being a wearable glass projection device when a received EDID extension from the companion device includes a non-zero field of view or pixel density value.

At 920, the wearable glass projection device of 919 comprises augmented reality glasses. At 920, the one or more processors further render augmented reality content with a number of pixels per degree defined by the non-zero field of view to create rendered augmented reality content. At 920, the one or more processors cause the wireless communication device to transmit the rendered augmented reality content to the augmented reality glasses when the received EDID extension from the companion device includes the non-zero field of view or pixel density value.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
   a communication device; and
   one or more processors operable with the communication device;
   the one or more processors causing, in response to the communication device detecting establishment of an electrical communication channel with a companion device, the communication device to query the companion device to determine whether the companion device is a projector, a monitor, or a wearable glass projection device; and
   the one or more processors determining, in response to the communication device receiving extended display identification data (EDID) and an extension of the EDID in response to the query, whether the companion device is the projector, the monitor, or the wearable glass projection device by extracting a display size from the EDID and a field of view from the extension of the EDID.

2. The electronic device of claim 1, wherein the wearable glass projection device comprises one of an augmented reality companion device or a virtual reality companion device.

3. The electronic device of claim 1, the one or more processors determining the companion device is the monitor when the display size is a non-zero value.

4. The electronic device of claim 3, the one or more processors further rendering content in accordance with the display size and causing the communication device to transmit rendered content to the monitor.

5. The electronic device of claim 1, the one or more processors determining the companion device is the projector when the display size and the field of view are both zero.

6. The electronic device of claim 5, the one or more processors further rendering content in accordance with a default projector parameter and causing the communication device to transmit rendered content to the projector.

7. The electronic device of claim 1, the one or more processors determining the companion device is the wearable glass projection device when the display size is zero and the field of view is a non-zero value.

8. The electronic device of claim 1, the one or more processors determining, in response to the communication device receiving the extension of the EDID in response to the query, that the companion device is the wearable glass projection device when the field of view has a non-zero value.

9. The electronic device of claim 8, wherein the wearable glass projection device comprises augmented reality glasses, the one or more processors further rendering augmented reality content in accordance with the field of view and causing the communication device to transmit rendered augmented reality content to the augmented reality glasses.

10. The electronic device of claim 8, the one or more processors determining whether the companion device is the monitor, the projector, or wearable glass projection device by parsing a product identification code from EDID received by the communication device from the companion device in response to the query.

11. The electronic device of claim 10, the one or more processors parsing the product identification code by transmitting a field of view query comprising the product identification code to a remote electronic device and receiving the field of view from the remote electronic device in response.

12. The electronic device of claim 1, the one or more processors determining, in response to the communication device receiving the extension of the EDID in response to the query, that the companion device is the wearable glass projection device by further extracting a pixel density having a non-zero value from the extension of the EDID.

13. The electronic device of claim 12, wherein the pixel density is expressed in pixels per degree.

14. A method in an electronic device, the method comprising:
    establishing, with a communication device, a wireless electrical communication channel with a companion device;
    querying, with the communication device, the companion device for companion device type;
    receiving, with the communication device, an EDID extension comprising one of a field of view or a pixel density; and
    determining, with one or more processors operable with the communication device, that the companion device consists of a wearable glass projection device when the one of the field of view or the pixel density has a non-zero value.

15. The method of claim 14, wherein the one of the field of view or the pixel density comprises the field of view and is expressed in degrees.

16. The method of claim 14, wherein the one of the field of view or the pixel density comprises the pixel density and is expressed in pixels per angle of degree.

17. The method of claim 14, wherein the wearable glass projection device comprises augmented reality glasses, further comprising when the one of the field of view or the pixel density has the non-zero value:
    rendering, with the one or more processors, augmented reality content in accordance with the one of the field of view or the pixel density to create rendered augmented reality content; and
    transmitting, with the communication device, the rendered augmented reality content to the augmented reality glasses.

18. The method of claim 14, further comprising:
    receiving, with the communication device, EDID comprising a display size with the EDID extension;
    determining, with one or more processors, that the companion device consists of a monitor when the display size has another non-zero value; and
    determining, with the one or more processors, that the companion device consists of a projector when both the display size and the one of the field of view or the pixel density is zero.

19. An electronic device, comprising:
    a wireless communication device; and
    one or more processors operable with the wireless communication device;
    the one or more processors identifying a companion device electronically in communication with the wireless communication device as being a wearable glass projection device when a received EDID extension from the companion device includes a non-zero field of view or pixel density value.

20. The electronic device of claim 19, the wearable glass projection device comprising augmented reality glasses, the one or more processors further rendering augmented reality content with a number of pixels per degree defined by the non-zero field of view to create rendered augmented reality content and causing the wireless communication device to transmit the rendered augmented reality content to the augmented reality glasses when the received EDID extension from the companion device includes the non-zero field of view or pixel density value.

* * * * *